(12) United States Patent
Mäkelä

(10) Patent No.: US 8,108,208 B2
(45) Date of Patent: Jan. 31, 2012

(54) METHOD AND AN APPARATUS FOR REQUESTING A SERVICE IN A NETWORK

(75) Inventor: Mikko Mäkelä, Lappeenranta (FI)

(73) Assignee: Saimaan IPR Oy, Lappeenranta (FI)

( * ) Notice: Subject to any disclaimer, the term of this patent is extended or adjusted under 35 U.S.C. 154(b) by 1408 days.

(21) Appl. No.: 10/590,720

(22) PCT Filed: Feb. 24, 2005

(86) PCT No.: PCT/FI2005/000119
§ 371 (c)(1),
(2), (4) Date: Jan. 24, 2007

(87) PCT Pub. No.: WO2005/081503
PCT Pub. Date: Sep. 1, 2005

(65) Prior Publication Data
US 2007/0174043 A1 Jul. 26, 2007

(30) Foreign Application Priority Data

Feb. 25, 2004 (FI) ...................................... 20040296

(51) Int. Cl.
*G06F 17/20* (2006.01)
*G06F 17/27* (2006.01)
*G06F 17/21* (2006.01)
*G10L 11/00* (2006.01)

(52) U.S. Cl. ................... 704/10; 704/1; 704/9; 704/270

(58) Field of Classification Search .................... None
See application file for complete search history.

(56) References Cited

U.S. PATENT DOCUMENTS

| 5,895,466 A | 4/1999 | Goldberg et al. |
| 6,405,060 B1 | 6/2002 | Schroeder et al. |
| 2003/0040850 A1 | 2/2003 | Najmi et al. |

FOREIGN PATENT DOCUMENTS

| EP | 0 938 052 | 8/1999 |
| FI | 109952 B | 12/2001 |
| WO | WO 99/53676 | 10/1999 |
| WO | WO 01/95145 | 12/2001 |

*Primary Examiner* — Justin Rider
(74) *Attorney, Agent, or Firm* — Young & Thompson

(57) ABSTRACT

The invention relates to a method and an apparatus of requesting a service from a communications network. In the method the following steps are to performed: generating an objective statement in a user equipment; communicating the objective statement from the user equipment to a mediator unit; comparing the objective statement to a list of objective statements in the mediator unit; establishing the service based at least partly on the comparison; and providing the service to the user of the user equipment.

36 Claims, 16 Drawing Sheets

Fig. 5A 5-18

| Look | See | Publish |
| Listen | Quit | Save |
| Send | Send | Perform |
| Read | Read | Play |
| Record | Publish | Pick |
| Find | Save | Remember |

5-22　　　　　5-23　　　　　5-24

| Publish | photos | Publish photos |
| Quit | text | of last Christmas |
| Start | a recording | of birthday party |
| Pull | calendar notes | of Goodman's |
| Push | an invitation | of a person |
| Stuck | an inquiry | of ** |

5-25　　　　　5-26　　　　　5-27

→ write the name
　　Jill
　　John
　　Anna
　　John Jr.
　　Grandma 5-28

Fig. 5B

```
→ Call
  Read
  Send
  Remember
  Listen
```
5-4

```
→ Read
  Send
  Remember
  Listen
  Set
```
5-6

```
  Call
→ Read
  Send
  Remember
  Listen
```
5-8

```
→ text messages
  email
  news
  instructions
  Internet
```
5-10

```
→ email
  news
  instructions
  Internet
  a book
```
5-12

```
→ news
  instructions
  Internet
  a book
  Jokes Online
```
5-14

```
→ World today
  Sport news
  Technology news
  Local news
  Entertainment news another option ->
```
5-16

```
→ about sports
  about technology
  when I have time
  at airport
  about politics another option ->
```
5-18

```
Scientists find a cure
for cancer
A group of top scientists
working on the long
avaited cure for ... -> another option ->
```
5-20

METHOD AND AN APPARATUS FOR REQUESTING A SERVICE IN A NETWORK

FIELD OF THE INVENTION

The present invention relates to teleinformatic systems and more particularly to a method and apparatus of requesting a service in the teleinformatic system.

BACKGROUND OF THE INVENTION

A user using a teleinformatic system, the system pertaining to information technology, usually has some objective. This objective can relate e.g. to a working duty or to a need for communicating with other users.

One of the main problems associated with the prior art teleinformatic systems is how the user can reach his objective. As more and more functionality, including external services, is available from devices, the problem has been getting worse. This problem has been tried to solve by providing possibilities to personalize user interfaces of teleinformatic equipment like mobile phones. The user interface of the mobile phone can provide quick menus or one-touch functions, whereby, when pressing a key of the mobile phone long enough, some function for the objective is directly reached. Both the key and the function have typically been settable by the user.

However, there are also problems related to personalized user interfaces like the above described quick menus or one-touch functions. The use of that kind of personalized user interface requires remembering of functions related to the menus and keys. Furthermore, the setting or definitions of the functions requires knowledge on how to program the functions. Also the user interface is typically restricted in many relations, e.g. there is a limited number of keys in the mobile phone, and menu hierarchy is hard to alter in reasonable way.

Another main problem with the prior art teleinformatic systems is, once the user has reached his objective, how the user can be kept informed about the objectives that are or become relevant to him/her, or which the user might want to advance.

Currently, there is no easy to use and efficient way for the user to express an arbitrary objective and then reach service(s) being of use for the realization of the expressed objective. Furthermore, there is no efficient way of keeping the user informed about relevant objectives via the same user interface.

BRIEF DISCLOSURE OF THE INVENTION

An object of the present invention is thus to provide a method and an apparatus for implementing the method so as to solve the above problems. The objects of the invention are achieved by a method and an arrangement, which are characterized by what is stated in the independent claims. The preferred embodiments of the invention are disclosed in the dependent claims.

The invention is based on the idea of the method and apparatus:
 maintaining a verb list comprising several verbs;
 maintaining an object part list comprising several object parts;
 maintaining a service list indicating several services;
 maintaining a first association list comprising several first associations, each of which associates one verb in the verb list and one object part in the object part list;
 maintaining a second association list comprising several second associations, each of which associates one service in the service list and one first association;
 displaying at least one verb from the verb list to the user;
 displaying at least one object part from the object part list to the user, which object part has an association with the verb in the first association list,
 selecting services such that each selected service has an association with the combination formed by the verb and the object part, and displaying the selected services to the user;
 in response to receiving an acceptance of a service from the user, requesting the user-accepted service via the network.

An advantage of the method and arrangement of the invention and its embodiments is that the user of the teleinformatic system can rapidly, easily and reliably reach his objective.

BRIEF DESCRIPTION OF THE DRAWINGS

In the following the invention will be described in greater detail by means of preferred embodiments with reference to the accompanying drawings, in which

FIGS. 5A and 5B show different views of the user interface when establishing the objective statement;

DETAILED DESCRIPTION OF THE INVENTION

The invention and its embodiments relate to a method and an apparatus for requesting a service in a network. To reach the service a user has to define the objective statement comprising of a verb as a first part of the objective statement and possibly one or more object parts as further parts of the objective statement. With the help of the objective statements the user can reach one or more services. A list of verbs comprising several verbs, a list of object parts comprising several object parts, a service list indicating several services, and associations of verbs, object parts and services can be centrally or in a distributed manner maintained in one or more of e.g. the following elements (referrals to FIG. 1): a user equipment UE1, UE2, UE3, a mediator element MED, a database DB1, DB2, a service provider element SP1, SP2, or an element of communication network CN1, CN2. In the operator element OP, which can be located in or be connected to CN1 or CN2 or the service provider, e.g. location processes of the user equipment can take place.

Figure 7:
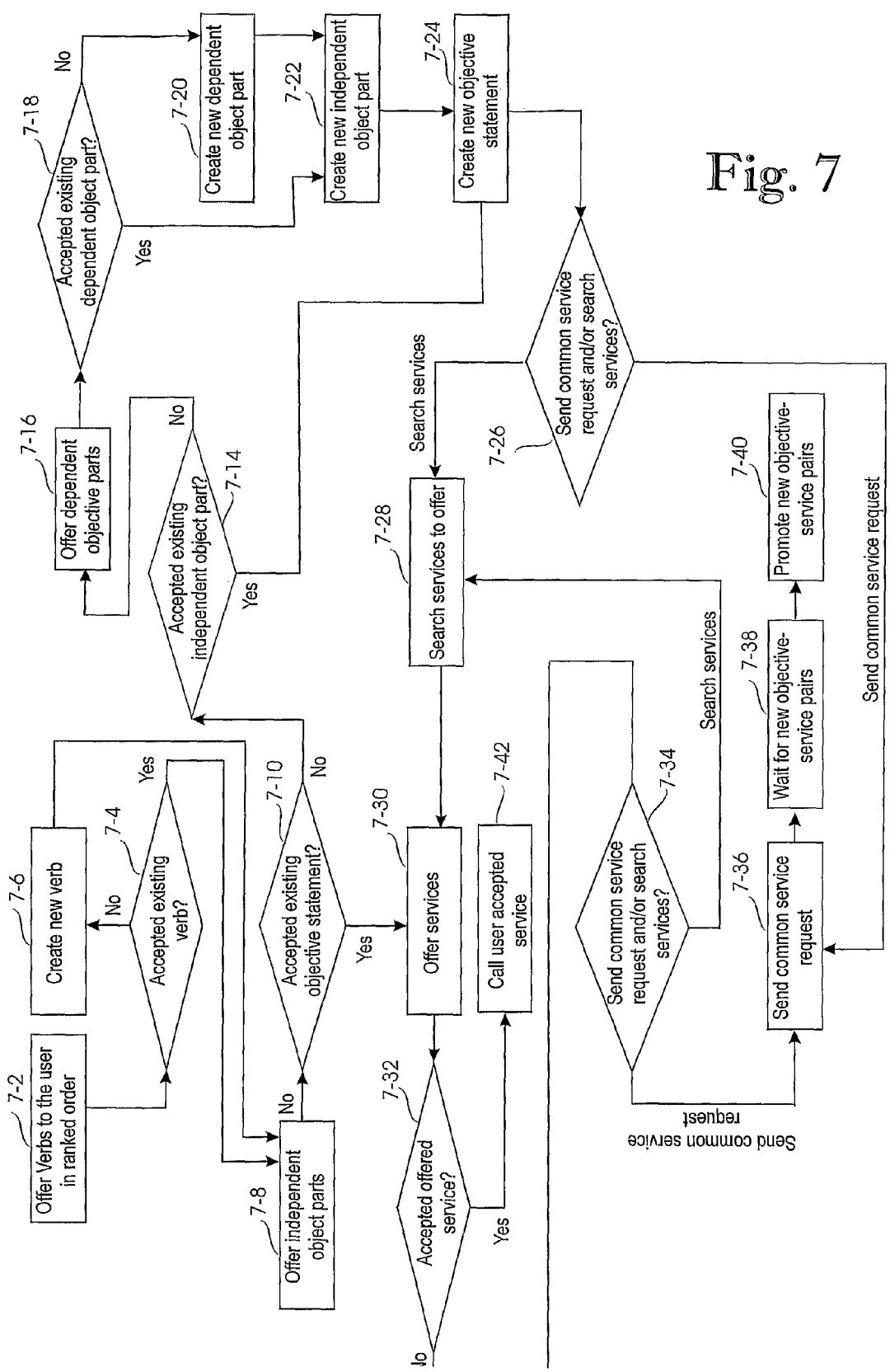
FIG. 7 shows a flowchart of functional logic of the invention and its embodiments.

Different method steps and maintaining of one or more lists according to the invention and its embodiments can be implemented by databases and/or program structures and/or data structures and/or programs. Examples of data structures are given e.g. in FIGS. 5A and 5B. FIG. 7 gives an example of the flowchart that can be implemented by the computer program.

The apparatus of the invention and its embodiments can be e.g. in user equipment. This has the advantage that no connection to the network is needed when the service is being established. Also the delays of accessing databases can be avoided.

The apparatus of the invention and its embodiments can also be in a network element, e.g. in a mediator element. This has the advantage that a user equipment can thus possess less resources, e.g. less memory for establishing the service. Another advantage is that many users can use the same apparatus via a communications network, e.g. via a packet switched network. Users using the apparatus via the network can belong to a group having group settings and possibly their own personal settings.

Figure 1:
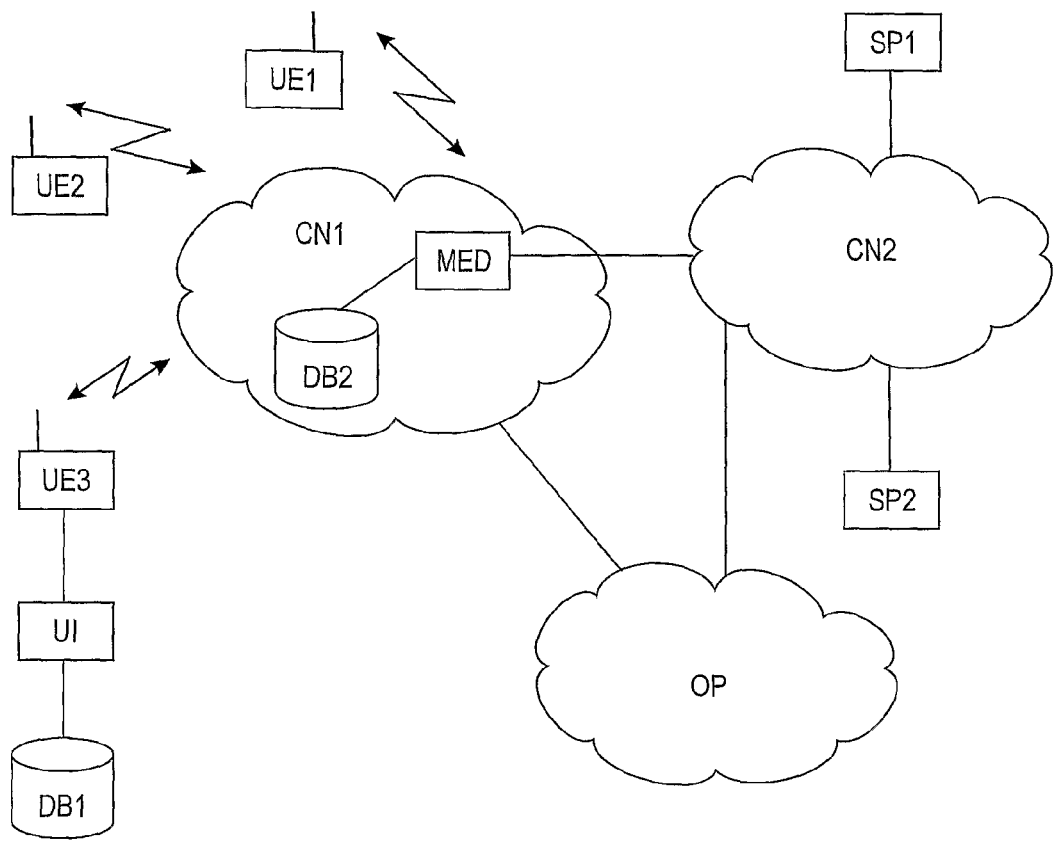
FIG. 1 is a system diagram illustrating the important components for the invention and its embodiments.
Figure 20:
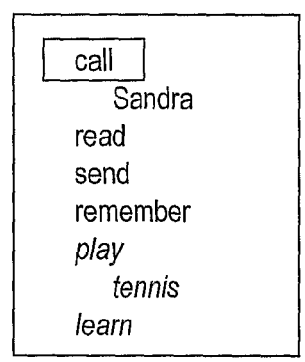
FIG. 20 shows an example of the user interface.

FIG. 1 is a system diagram illustrating the important components for the invention and its embodiments. In the teleinformatic system there can be one or more mediators MED. The purpose of the mediator is to obtain, collect and mediate information. It can obtain or collect information e.g. from users using a user equipment UE1, UE2, UE3, the users being registered to the mediator, from service providers SP1, SP2 and from other mediators. The mediator can mediate information e.g. to its users, to third parties and to other mediators. A part of the functionality of the mediator can be transferred to the user equipment.

The form of the information obtained, collected and mediated can be e.g. links between objective statements and services associated to them, information on choices made by the users, and grading of objective statements and/or services and their relations by users. The mediator can use the information to define weight values for objective statements, parts of objective statements, namely verbs and object parts, services, and second associations i.e. objective statement—service pairs. The mediator can also convey information to other mediators e.g. on choices of services that it has obtained from the other mediators.

Mediators can also organise said information. This organisation can be based e.g. on probabilities that the users or clustered user groups need the information when expressing objective statements and accessing services.

These probabilities can be at least partially based on the number, i.e. the frequencies, of the use of the information. Frequency of use information is easily interpreted as probabilities by e.g. calculating proportions of absolute frequencies, i.e. relative frequencies, or using Bayesian formula. Also other more complex probability based calculations using the frequency of use information can be used. This probability information can be used to update dynamically the weights that define ranking, i.e. the order of verbs, object parts, services, or other selectable-parts and associations when offered to the user.

Selectable-part can be defined to mean any text segment that the user can choose from the screen and include as his input. Thus selectable-part can be e.g. textual presentation of the objective statement, or its segments, ie. the verb or the object part, or the service, or the part of textual presentation, i.e. word(s) of object part currently selectable, meaning available for user to choose, on the screen.

The mediator can also use the information to form structures between the objective statements based on users' choices. The structures can be e.g. similitude-, sequential-, top- and sub-relations between the objective statements. Similar structures can also be formed between the verbs and/or the object parts. These structures can be used to alter the above-mentioned probabilities of use and/or initialise information associated to new objective statements based on their relation(s) to the existing objective statements.

Different service providers and mediators can constitute one network or many networks. The mediator MED can e.g. communicate with the user equipment UE1, UE2, UE3 via the first communications network CN1 and communicate with the service providers SP1, SP2 and other mediators connected to the second communications network CN2 via that second communications network CN2. The communications networks CN1, CN2 can also be one and the same communications network. The service providers SP1, SP2 can be organisations that have responsibility of at least one service, its updating and functionality. When the service provider connects to the system, it can give information on its identification and available services to the mediator. New service can also be provided via Internet and found e.g. via Internet search engine. The service provider and/or the mediator and/or one user can associate this new service to the objective statement. After this the user can choose the service that has been connected to the objective statement.

The user equipment UE1, UE2, UE3 can be whatever device, which allow the user to access services. The user equipment of the invention and its embodiments can be equipped with a user interface UI that can be used to produce and/or choose the objective statement and the database. The database DB1 that can maintain information on at least the objectives the user most probably has and services linked to the corresponding objective statements can be in the user equipment. Alternatively, to be able to access the database DB1 rapidly, the database can be located e.g. in Bluetooth network, in WLAN (Wireless Local Area Network) network or in LAN (Local Area Network) network.

The databases DB1, DB2 are entities where data has been/can be collected. Data in the database can relate to a specific target area, e.g. to objectives and services. The database can be used and updated by one or more applications.

Figure 2:
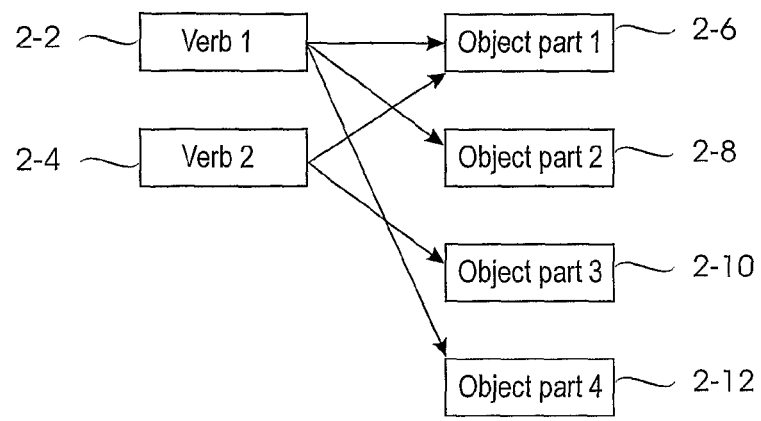
FIG. 2 describes possible associations of different parts of objective statements.

To reach the service the user has to define first the objective statement e.g. in the user interface UI. FIG. 2 describes how different parts of objective statements are possibly associated to each other.

According to the invention and its embodiments the objective statement comprises of two parts: The first part, which is obligatory and which is always a verb and the second part, meaning a combination of one or more so-called object parts. There can be a distinction between independent object parts and dependent object parts. Independent object parts can be those object parts that can be used by themselves after expression of verb to form understandable objective statements. All other object parts, namely those object parts that are used only in conjunction with some other object part(s), can be said to be dependent object parts. In FIG. 2 there are shown two verbs 2-2, 2-4. Each of them is related to one or more object parts, of which some are common to both verbs and of which some relate only to one or the other verb. Thus the first verb 2-2 relates to three object parts 2-6, 2-8, 2-12 and the second verb relates to two object parts 2-6, 2-10. When the user has accepted the verb and the object part(s), he has accepted the whole objective statement.

In practice, as will be seen in the following, at the beginning of requesting a service some verbs can be presented to the user in the user interface. The user can accept one of these 2-2, 2-4 or scroll further the other verbs. The verb can be accepted e.g. by a key or a pointer device like a mouse, a pen or a finger. Furthermore, the verbs can be presented in a ranking order so that the verb 2-2 with a higher ranking can be presented before the verb 2-4 with a lower ranking. The search of verbs can also be incremental search so that those verbs are firstly presented that match the beginning of the letters inputted by the user. Using incremental search has also the advantage that users do not have to cognitively separate "search" from merely starting to write the objective.

To make it easier for the user to use the incremental search the starting part of the verb can be highlighted e.g. by underlining or bolding the searched letter(s). The object part of objective statements can also be shown in connection to the verbs. It is also possible that one or more services that have association(s) with the first and/or the second part of the objective statement are presented while the objective statement is entered and/or showed.

In one embodiment, when the user has accepted the verb, the object part 2-6, 2-8, 2-10, 2-12 of the objective statement can be presented in ranking order so that the object parts 2-6, 2-8 with higher weights, ranking can be presented before those object parts 2-10, 2-12 with lower weights, ranking.

The object parts can be restricted to parts, which have the association from the verb accepted by the user. If these object parts come to the end of the list of the object parts also the other object parts can be presented for user to choose. In this case, the independent object parts can be offered first and if these come to an end, the dependent object parts can be offered. Also in this case those object parts can be presented that match the beginning of the letter(s) inputted by the user. To make it easier for the user to use the incremental search also the beginning part of the object part can be highlighted e.g. by underlining or bolding the searched letter(s). Later it is shown how the object parts can be offered in such order that the expressed objective statement will most probably be intelligible. It must be noted that the input does not inevitably mean one character in the input but can also means a plurality of possible characters.

The ranking can be partially dynamic e.g. according to the above-mentioned weights, but also partially static in order to support user routines. The change between static and dynamic ranking can be made depended e.g. on user preference-settings, usage patterns etc. The user can e.g. set that the certain service for the certain objective statement will always be ranked first or among few first ones.

In one embodiment of the invention the screen area that is used for presenting the objective statements for the user is divided into two or more parts. The division can be visual but it does not have to be visual. When divided into two parts the first part can be reserved for the dynamically ranked objective statements and the second part can be reserved for the statically ranked objective statements. This method will be explained later in more detail.

Different screens like a list screen or a spiral screen are suitable for presenting the selectable parts, e.g. the objective statements or their segments, the verbs and the object parts, or the services. The screen can be any user interface where texts to be chosen can be presented so that the higher ranked parts can be presented before the lower ranked parts, i.e. the screen supports choosing of higher priority text elements more easily. In the spiral screen selectable text parts can move spiral like. In the list screen selectable text parts are listed e.g. one above the other.

The screen supports the function of the dynamic of the system in the direction where users on average use existing objective statements. This has the advantage that a new objective statement is more often created based on already existing objective statement by users and thus the new objective statement can "inherit" the list of services from the existing objective statement that has same beginning.

The invention and its embodiments are based on the fact that many if not all objectives can be expressed such that first a verb is expressed and second the rest of the objective is expressed. This makes it possible to restrict the form of expressing objectives, thus restricting the number of possible inputs, without loosing naturalness of expressing or naturalness of language. Because the number of probably used verbs in objective statement is likely to be vastly smaller compared to the number of probably used substantives, the verb can be expressed rapidly, especially by using incremental search. After the verb has been accepted, the number of probably used next words, i.e. the object part, collapses and thus they can in general also be expressed quite rapidly.

As the information is collected from large group of users, this makes it possible to collect and maintain a comprehensive enough lists of objective statements and their associations with services so that users can generally find a service matching their objective via the objective statement that is available to them according to their own intuition.

Combined with the ranking of user selectable parts of objective statements by e.g. their probability of being suitable for the user this means that the users will usually find the suitable objective statement fast, even if it were not exactly the same the user had in mind, and thus the right service(s) for reaching their objective. Moreover, the fact that system facilitates the use of existing objective statements means that more frequently information for often-needed objectives will be collected and thus the dynamic ranking of services will be based on more data. Thus the acceptance of suitable objective statement and service can usually be made via incremental search and choosing, is both fast and easy and requires practically no remembering from the user.

Another advantage of facilitating the choosing of parts of objective statement with ranking is that new objective statements expressed by the users are most likely made by refining an already existing objective statement after the user has not found the objective statement that would match his/her objective, to choose. This is beneficial, because it means that information from those objective statements based on which new objective statements are created can be directly used as initialising the information for new objective statement e.g. via forming similitude-relations between the new and existing objective statements. This way services can be associated to a new objective statement.

In other words, the problem of finding the service can be solved by combining the objective-oriented user interface solution with collective information from many users. This can be further aided by giving to service providers, third parties and other users efficient ways of making their own services reachable, e.g. by means of the complete objective statements, for others via the same user interface, as will be discussed later.

Figure 6:
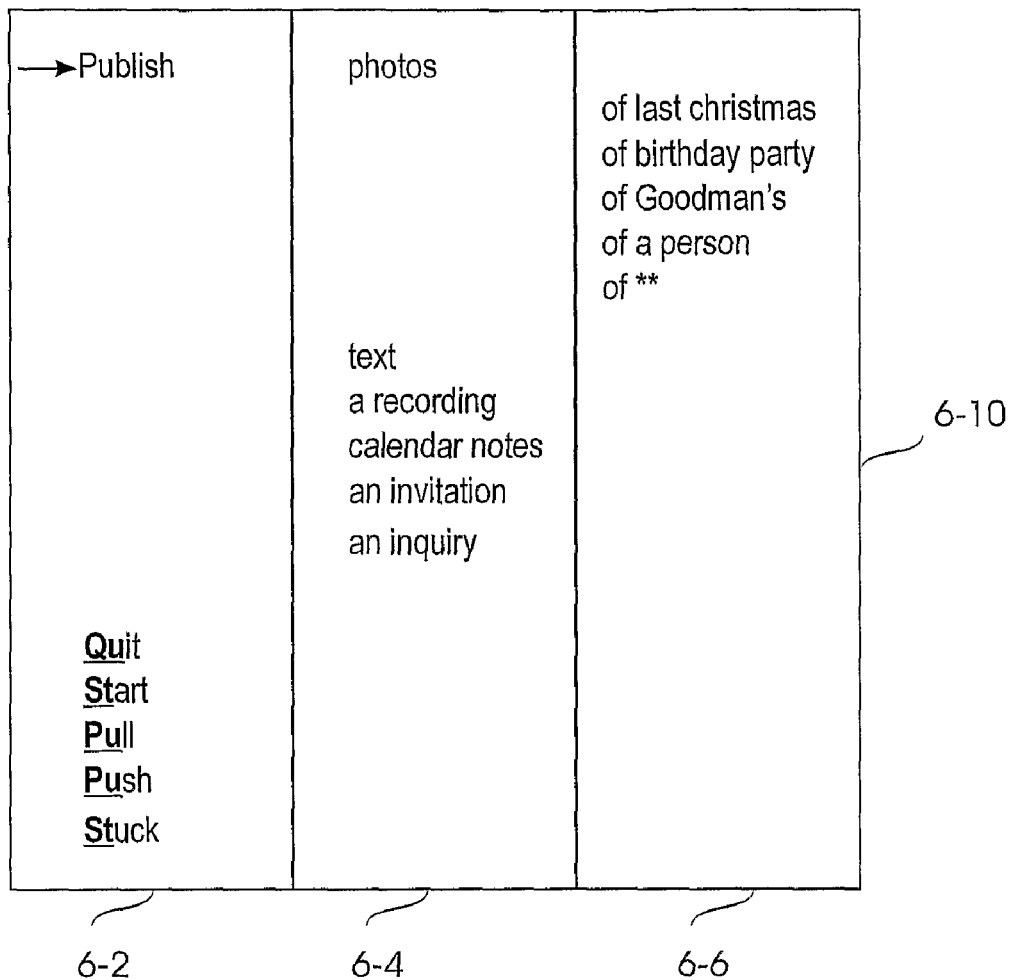
FIG. 6 shows a list of objective statements.

FIG. 6 shows a list of objective statements. The column 6-2 presents an exemplary verb list comprising several different verbs (Publish, Quit, Start, Pull, Push, Stuck) that can be directly chosen. The columns 6-4 and 6-6 present two object part lists comprising several object parts for the verbs. A service list indicating several services is not presented in FIG. 6.

In FIG. 6, the list presented in column 6-4 comprises of independent object parts and the lists presented in column 6-6 comprises of dependent object parts, specifiers that specify the object part in greater detail.

Mediator can choose to accept object part to be independent object part only after some criteria has been fulfilled, like reviewing by trusted person (e.g. an employee/a user) or more than one user using the object part by itself after a verb.

One verb in the verb list and one or more object parts in the object part list(s) can be associated and a first association list comprising these several first associations can be established. It is thus possible to "Publish photos of last Christmas", to "Publish text", or to "Publish an invitation of birthday party" by choosing and including as user input suitable verb and object part(s), without further user input.

Figure 3:
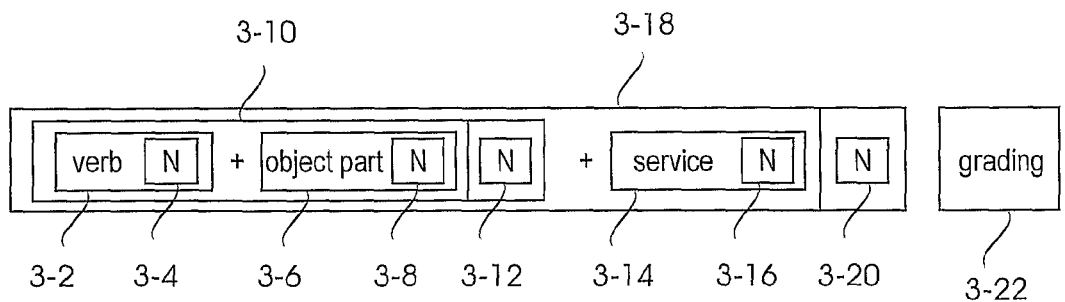
FIG. 3 describes a structure of objective statement and the service pair.

FIG. 3 describes a possible structure of an objective statement 3-10 and a service 3-14 formed objective statement—service pair 3-18. The objective statement comprises at least two parts. The first part of the objective statement can be defined as a verb 3-2. Technically defined the verb can be a string, and the user can input an individual string that is used in the user interface like the verb. Alternatively, the first part of the objective statement does not necessary have to be a grammar like verb, but this rule can be deliberately broken when the term can also be a term added by the user to the list of terms in order to personalize his/her user interface or used by authorized service provider to e.g. promote interest, as discussed later. Also other authorized parties can sometimes use some other word than the verb in this position, e.g. for advertising purposes.

A way of emphasizing selectable parts is to promote them. The promotion of selectable-parts can be defined as temporarily raising its ranking. The promotion can be time dependent or continue until some event occurs like e.g. user uses the promoted selectable-part. The level of promotion is possible to be altered by altering e.g. the objective statements' position on the screen and possibly also by emphasizing it somehow, e.g. by the bold typeface, by the different type colour, flashing etc.

When objective statement is said to be promoted it means that all selectable-parts of it, namely verb and object part(s) are promoted. When objective statement—service pair is said to be promoted it can mean that also said service is promoted.

At least one part 3-2, 3-6 of the objective statement can have a weight value 3-4, 3-8, defining e.g. the ranking i.e. in which order parts of the objective statements are presented in the user interface UI. Also the objective statement 3-10 can be weighted 3-12, and define e.g. the ranking of objective statements within those embodiments of the invention where whole objective statements are represented initially.

Weight 3-4 which is associated to the verb 3-2 can be used to tell the ranking of the verb among other verbs. Weight 3-12 which is associated to the objective statement 3-10 can be used to tell the ranking of the object part when the verb 3-2 has been accepted and there exists an association from the verb to the object part 3-6. Weight 3-8 which is associated to the object part 3-6 can be used to tell the ranking of the object part among those object parts that are not associated with the verb 3-2, in the case that object parts that are associated with the verb 3-2 have run out.

Weight 3-20 is associated with the objective statement—service pair 3-18 and can be used to tell the ranking of the service 3-14 when the objective statement 3-10 has been accepted and there exists an association from the objective statement to the service 3-14. Weight 3-16 is associated with the service 3-14 and can be used to rank service among other services in the case when no or only little frequency of use information for objective statement—service pair 3-18 is available and/or the services are associated to objective statement via automated search based e.g. on service description.

One possibility for calculating the weights is to use the overall usage frequency of users usage of the objective statements, verbs, object parts, services and objective statement—service pairs for estimating the probability that they are used in different stages of the process. Then weight 3-4 for verb can be calculated as frequency of overall usage of said verb. Weight 3-12 for objective statement can be calculated as frequency of overall usage of said objective statement. Weight 3-8 for object part can be calculated as overall usage frequency of said object part. Weight 3-20 for objective statement—service pair can be calculated as overall usage frequency of said objective statement—service pair. Weight 3-16 for service can be calculated as overall usage frequency of said service.

It should be noted that "usage" can be defined to mean not only acceptance of some selectable-part, but also e.g. the acceptance of whole objective statement—service pair can be required prior accepting the information concerning one selectable-part contained in the pair. Or on the contrary, e.g. just expressing object part without accepting the whole objective statement can be made to contribute to the usage frequency of said object part. In the case of object parts, some object part can be contained in larger object part. In this case the containing object part(s) can be considered also be used when the larger object part is used. These "usages" can be recorded as with lower contribution by e.g. adding the said usage/expression of object part with <1.0 value to the sum of overall usage times.

While absolute frequencies are sufficient for comparison and ranking between similar items, relative frequencies can be preferred as they have direct probability interpretation, which helps to maintain the information, especially in the case of multiple mediators. Technically relative frequencies can be implemented e.g. as floats between zero and one or integers with known divider for scaling. Also other values calculated from the usage information can be used, e.g. the Bayesian formula can be used besides relative frequency, time-window for accepting given information or some other method to emphasize more recent usage information over older one can be used.

The usage frequency information is often enough for achieving good results for user to be able to call a service matching his objective with minimal effort. However, because there exists numerous objectives, where the ranking of most suitable services should depend on the current situation of the user, information about the situations at the time of acceptance can be used to make the prediction of most suitable service more accurate.

Situation can be characterized by variables, like e.g. location of the user/device at the time of acceptance and this information can be recorded along usage information. The weights can be separately calculated to e.g. different device types, different user groups or different users. Thus the weights can be made more personalized and suited to the situation at hand. With modelling techniques like Bayesian networks or Minimum Description Length (MDL) methods, same effect can be achieved by enriching the information with above mentioned recorded information, e.g. information about user group/class, device type, or more situational variables like location, time and/or class of current social happening, situation. This information can be fed alongside the usage information to the model. The model's output can then be used instead or in addition to frequency values to determine the probabilities of selectable-parts being used, and these probabilities translated to weights.

A combination of one or more of object parts 3-6 (FIG. 3), 6-4, 6-6 (FIG. 6) with the first part 3-2 of the objective statement 3-10 forms an understandable objective for the users. The second part of the objective statement can also be technically a string. Instead of comprising verb and object part(s), the objective statement can also comprise only of the verb, if the last, object part is an empty string. The objective statement can be in whatever case like in passive or in imperative. The objective statement can also be presented prior to or after of some standard phrase like "My goal is to" or "I would like to". When presenting the information in textual form to the user, the order of presentation can be depended of the language and chosen case, i.e. if the objective statement is e.g. in imperative or passive. For example the English sentence "I'd like to drink coffee" could be expressed in German "Ich möchte Kaffee trinken", where the verb is presented later than the object part. However, it can still be required for the user that the verb is expressed before object part i.e. in this example the input can be acquired in sequence where the verb "trinken" is expressed first and then the object part "Kaffee", "Ich möchte" being a constant string attached to the sentence when it is possibly viewed to the user as whole, to support his cognition.

The form of the objective statement appears to be somewhat similar to regular commands used e.g. on the computers' command prompt. However, the objective statement does not unambiguously define the service to be effected, but helps the user to reach the services that most probably help the user to receive his objective(s). Although the form of the objective statement is restricted in the manner described above, the form is still much more free compared to the commands currently on use. Furthermore, many different objective statements can lead to same services, a property not possible by prior art commands.

The service can be defined to mean whatever internal or external service of the apparatus, which can be connected to the existing objective statement. The service can be accessed e.g. by URI (uniform resource identifier), which can be URL (uniform resource locator) information, other kind of WWW-address (World Wide Web), or telephone number of the service. Thus services can mean different physical services on different physical layers. Examples of internal services are setting the date and time of mobile phone, sending a short message, setting the apparatus to remind the user at the certain moment according to the PDA calendar application. Examples of external services are a location based map service provided by the operator, a buying and selling service of an e-shop in the Internet. The important thing is that there is an identification to reach the service when the user has inputted the objective statement related to the service.

Furthermore a basic-service can be defined to mean the service reachable by every objective statement, although the objective statement would be new in the system and without association to any services. A common service request can be defined to mean a basic-service of which help the user can find the service suitable to the objective statement with the help of a third party.

One possibility to use the common service request is the situation, when e.g. the user is not satisfied with the service(s) associated to the objective statement. Then he can send a common service request to at least one mediator for mediation to other users or other third parties. These third parties can then associate the sent objective statement with service(s), and after that information of associations can be maintained at mediator and means for reaching the service(s) can be mediated to the user. The mediator can hide the information about the user and third parties thus protecting their privacy. Further, third parties can associate a text or spoken message with the objective statement and send it to the mediator, after which the mediator can associate the delivery of the message as a service for also other users' service requests with same objective statement. Reward for making the associations can be given.

The element 3-22 in FIG. 3 describes grading given by at least one user. He may have graded e.g. the service, the objective statement related to the service or the association between the verb and the second part of the objective statement. This grading can be used to alter the above-mentioned weights.

There can be many ways to associate objective statements to services and thus form a second association, i.e. objective statement—service pair. One way is via common service requests mentioned above. The second one is when the user expresses the objective statement and the way to reach the service, or vice versa. The third one is the situation when the service is accessed in an application and the user expresses the objective statement and the way to reach the service is obtained via the interface provided by the application.

An example of the second way is when the user enters in connection with the expression of the objective statement an address of WWW-page or WWW-service or the URI-address needed to access the WWW-service. An example of the third way is when WWW-browser shows a WWW-page, the user expresses the objective statement, and the delivery of said WWW-page is associated as service with said objective statement. The linking information made by the user can be provided to mediators for mediating to other users. If the user provides this information, he can be awarded/rewarded.

Another basic-service, service-offer, can be defined as user expressing objective statement as usual and associating it to a service. By using default service descriptions, which e.g. give user's contact information and textual description about the service offered, this way anyone using the system can with minimal effort offer services to other users. By restricting the number of receivers e.g. to those, who have allowed the user to promote objectives on their UI, the invention and its embodiments can also be used as a new kind of personal communication tool.

Figure 4:
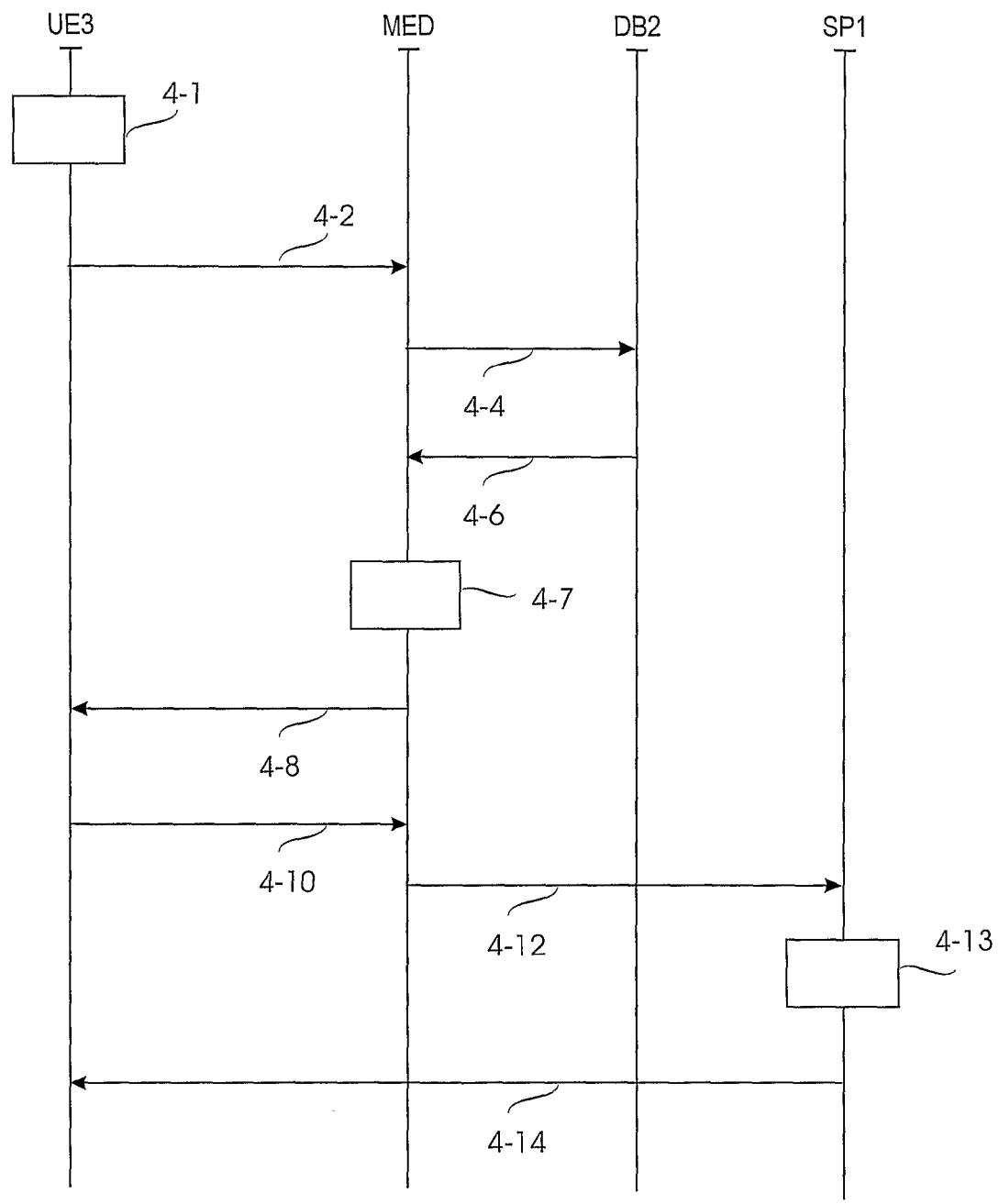
FIG. 4 is a signal chart showing how to reach the service based on the objective statement.

FIG. 4 is a signal chart of one embodiment of the invention showing how to reach the service based on the objective statement. In step 4-1 the user of user equipment UE3 establishes the objective statement, and in step 42 the objective statement is transmitted to the mediator MED. On the basis of the objective statement the mediator retrieves 4-4, 4-6 from the database DB2 one or more services that has association(s) to the objective statement. In step 4-7 the mediator connects the service with the objective statement and in step 4-8 the objective statement-service pair is provided for the user. In this step also a service description can be provided for the user. The service description can comprise the information of how to reach the service, and situational information about when the service is most suitable for use, like e.g. time or location dependency. Further, the service description can also comprise a form, which user can fill and the filled information can be sent with the service request to enable, enhance or modify the service functionality. The form can technically be e.g. HTML-form (HTML, Hyper Text Markup Language), XML (Extension Markup Language) form like World Wide Web Consortium Xform, or the form can be implemented as Java applet or Java midlet. Yet another possibility is that the form can be implemented as fields and software on the device that can understand the structure of the fields.

In case of a chargeable service also the charge of the service can be communicated to the user. The service description can also include information imposing that the service will be called without user acceptance. In this case some authorization mechanism can be used, e.g. the user can allow this via preference-settings.

The user can accept the pair and the possible charge and he or she can convey his or hers acceptance to MED element in step 4-10. After this in step 4-12 the mediator can communicate with the service provider element SP1, in which case the service provider SP1 can in step 4-13 retrieve the service and the service can be delivered to the user in step 4-14. Alternatively, if the means for accessing the service are conveyed e.g. in service description to the user device in step 4-8, steps 4-10 and 4-12 can be replaced with single step of calling the service directly from user device without mediator. In this case however, the information that user called the service with said objective statement should be conveyed to the mediator at the same or later time.

Any information, especially personal information, like names, addresses and telephone numbers, can be filtered out from the objective statements e.g. before step 4-2. This is particularly important when the objective statement is mentioned for the first time, i.e. prior to the acceptance of the objective statement to the system, and/or when personal information relates to private persons in comparison to public figures. One method of this is to ask for the user, who communicates a new objective statement, whether this objective statement and/or what information thereof can be delivered to the mediator(s) and other users. As another method an automated filtering system, e.g. in the mediator unit, can filter information based on predetermined conditions.

It is also possible for a user to send a remove information request(s) to a person authorized to administrate the maintained information, e.g. to remove information that is not meant to be on the list, which is confidential or not decent to be removed.

However, some personal information, like names of public figures, can be maintained and thus used in objective statements. This can be done e.g. by maintaining two lists of names: A first list including all names and nicknames and a second list including all names of public figures. When the objective statement is handled, the name comprised in the objective statement is compared to both lists. If the name is on the list of public figures, it can be accepted for mediation to other users. Thus e.g. objective statement "Go to Bruce Springsteen's concert" can be accepted for mediation, if "Bruce Springsteen" is on the list of public figures, but "Have lunch with Michael Watts" will not be accepted if the name "Michael Watts" is not in the list of public figures and either "Michael" or "Watts" or both are recognized as private names. Another possibility is that only surnames are filtered.

Because lists of closed user group mediators and lists of public user group mediators can have different filtering purposes or objectives, all mediators can check from where objective statements have been obtained. This checking can be based e.g. on confidentiality information comprised in objective statements.

To use confidential information mediators can be divided into different groups, e.g. to personal mediators that can handle private information of one user, closed user group mediators that can handle private information of one closed user group and public user group mediators. Each of these groups can have its own confidence classification. Also objective statements can have their confidence classification. Thus, information of objective statements can only be delivered between specified groups or can be delivered to mediators whose confidence classification is higher than that of objective statements. In FIG. 7 one embodiment of the invention is shown by a flowchart. The figure explains innovation's capability of giving the users uninhibited possibilities to express objective statements while still keeping the objective statements that are offered to users intelligible in general. It should be understood that the flowchart illustrates one preferred embodiment's logical functionality, which can be implemented in various ways, i.e. the flowchart is not meant for characterizing the modular division of the implementing software.

First a set of verbs is presented to user in step 7-2 allowing user to choose and accept the verb of his choice. Verbs are presented in ranking order. This ranking can at least partially be done according to weights 3-4. At the same time object parts that have associations with presented verbs can also be previewed, giving the user a taste of possible objective statements that are most easily expressed with the presented verb. This gives also better opportunity for those objective statements that are promoted to become spotted by the user. In the preferred embodiment the previewing of object parts is done according to the verb that is currently chosen, and the verb is highlighted e.g. by pointer or some other emphasizing to be distinguished from other verbs. This verb that can thus be accepted by performing acceptance function e.g. by pressing dedicated acceptance key, can be called pre-accepted.

If given user input does not match any verb in database DB1 (FIG. 1), verbs from database DB2 can be retrieved. In order to minimize the time user has to wait, retrieving can also be done anticipatory, meaning that when it seems likely that there are not enough verbs to present that match user input, the retrieval is started.

In step 7-4, if user has accepted an existing verb he moves to object part selection stage. Otherwise he can continue to give input after no existing verb match given input so far and thus express a new word to the system. After user accepting his input, this new first part of objective statement is created in step 7-6. If the user expresses a new first part of objective statement not found from verb list, it is then saved to a database and usable for later selection. Preferably the new verb is not however mediated to other users from mediator database DB2 without mediator's representative's reviewing and acceptance, but to the user's personal database DB1 and possibly to some restricted user groups' databases.

After acceptance of verb, a set of object parts is presented to the user in step 7-8 to choose and accept the object part of his choice. Like verbs, object parts can also be presented in ranking order. This ranking can at least partially be done according to weights 3-12 of objective statements 3-10. Likewise the weights for verbs, these weights can be separately calculated for e.g. different device types, user groups or users. At the same time services that have associations with presented objective statements, meaning the objective statements formed by already accepted verb and presented object parts, can also be previewed, giving the user a taste of possible services that are available for choosing with these objective statements.

In step 7-10, if the user has accepted already existing objective statement, he is offered a set of services in the service selection stage starting in step 7-30. Otherwise in step 7-14 if user accepted objective statement with already existing independent object part, but there did not exist an association between the verb and the object part, an association is formed and thus new objective statement created 7-24. Otherwise the user's input does not match any existing independent object part, in which case he is next in step 7-16 offered dependent object parts that match the input. These can also be offered in ranked order. The ranking is based at least partially to the information, in which place the dependent object part usually resides in the input i.e. those dependent object parts, which have not been usually used in the beginning of input for object part are offered lastly for that position and those dependent object parts, which are only usually used in the beginning are offered lastly for any other position. This can be done e.g. by maintaining proportions of the first word of the dependent object part being also the first word of the whole expressed object part vs. it being second or later word of the whole expressed object part. This will ensure that in most cases user can form intelligible objective statements by choosing offered dependent object parts. While users can still express any kind of object parts, the non-intelligible ones will very likely be used very seldom and thus offered lastly, even in the case they are not filtered at the mediator. The secondary ranking criteria for dependent object parts are weights 3-8. These two ranking criteria can be balanced e.g. by dividing the object parts to two classes according to some threshold frequency of being used at the given position and then offering first the object parts from the class over the threshold ranked according to weight 3-8 and if these run out, offering object parts from the class below the threshold ranked according to the weight 3-8. As yet another ranking criteria, sequential-relations between dependent object parts can be formed such way, that statistics of given object part appearing after another are kept. This information can be initialized by using words of the used language and mining sequential information from large text corpuses.

It should be understood, that user can include more than one existing dependent object part as his input in step 7-16, i.e. after user including one dependent object part, more dependent object parts can be offered to user. Then primary ranking criteria can be the length of shared text between offered object part and ending of the input.

If in step 7-18 user has accepted existing dependent object part, new independent object part is formed in step 7-22 from the text accepted after the verb, meaning possibly one or more included object parts. This new object part is stored at local database and preferably transferred at some point also to mediator database. Like verbs and objective statements, object parts can be reviewed e.g. for grammar and/or private information at mediator before accepting them for mediation to other users. Independent object part can technically be implemented e.g. as string or associations between the dependent object parts which form it.

Otherwise in step 7-18 user has not found suitable dependent object part and continues to give input in step 7-20. The process ends when the user accepts what he has inputted, as he would have accepted an offered existing object part. Then a new dependent object part is created from all text that has been inputted and possibly included after verb.

After the creation of new independent object part, a new objective statement can be created 7-24 by associating the accepted verb and independent object part.

After creation of objective statement similitude-relations can be created between newly formed objective statement and existing ones.

If e.g. the new objective statement shares same dependent object parts with other objective statements, these objective statements possibly have something in common and similitude-relation can be created. Similitude-relation can be assigned strength of the relation and they can be used in order to search services from existing old objective statements that are somehow similar to the newly created one.

Because users on average try to express their objective shortly, and many objective statements are formed by users continuing an already existing objective statement, those object parts that are usually expressed first are on average more important considering the similitude. Object parts that are expressed lastly are on average specifying on their nature. These and other issues like the length of the shared object parts can be used to determine the strength of similitude-relation.

Because new objective statement is not yet associated with any services, a decision is made in step 7-26 and services can be searched 7-28 and/or associated by using the common service request 7-36. These can be done in parallel in different threads. The choice between these methods can be based e.g. on user preferences, network conditions and so on. The choice can also be different if user founds no suitable service and the decision is done again in step 7-34.

Because getting new service associations by common service request typically takes some time, the services are preferably made available to the user by promoting the new objective statement—service pair in step 7-40 after waiting them in step 7-38. This way the user can spot the new association whether he is still in service selection stage or not.

The similitude-relations can be used for searching services 7-28 that match the objective statement. The services can be searched via associations of the objective statements that have similitude-relation with the objective statement. Differentiating words that exist in new objective statement, but not in the old one can be used as keywords and searched from those services' descriptions that are associated with the old objective statement. The searched services can be ranked according to the strength of the similitude-relation and matching of the keywords. To minimize the user waiting time, services can be first searched from objective statements— service pairs available in DB1, but they can also be searched from DB2.

Services can also be searched with e.g. general Internet search engine by using one or more words from objective statement. Because general search engines are primarily meant for finding general content, services found this way are on average worse in quality and can thus be ranked accordingly low. Searched services can be associated to the objective statement in order to prevent the need for searching the same services again. They can be distinguished from other associated services by e.g. lower weights or attached information field.

In order to personalize the system, weights 3-4, 3-8, 3-12, 3-16, 3-20 (FIG. 3) can be separately calculated for individual users by combining their usage frequency information with others in such way that their usage information is emphasized. This can be done e.g. on user equipment, while overall usage frequency is best calculated on mediator.

It should be understood that the implementation of acceptance-commands for verb, objective statement and service could be different, e.g. a different or longer keystroke. This can help e.g. to more easily accept objective statement when user wants to use only the verb as objective statement.

FIG. 5A illustrates one example according to the invention and its embodiments. In it Jill has taken photos by her mobile phone equipped with a camera and she likes to send them to her relatives.

When Jill opens the user interface UI and/or the application for requesting the service, she sees on the screen 5-22 some verbs. The verbs can be presented in ranking order according to the weights 3-4 that have been associated to the verbs like stated earlier. Thus these can be e.g. the verbs (Look, Listen, Send, Read, Record, Find) she has used most frequently and/or which all the users have used most frequently. Since Jill's purpose is to publish photos, and there are no suitable first parts for "Publishing" to be seen at the moment on the screen, she enters the first letter "P" of the verb "Publish" occurring to her. If she uses the predictive text input method familiar from mobile phones, the input is not at this phase unambiguous, because the "P" key can comprise all letters "7PQRS". Thus she can see on the next view 5-23 of the screen the available verbs that relate to any of the letters 7, p, q, r and s, namely the verbs See, Quit, Send, Read, Publish, Save. The verbs can still be ranked according to the said weights.

In the next step she can scroll the pointer 5-18 four times down to choose the verb she wants to accept. The content of the screen can scroll accordingly revealing more verbs according to the ranking based on the weights. After thus choosing the suitable verb "Publish", the screen 5-23 has updated to screen 5-24, where "Publish" is placed at the first position. Other verbs now seen on the screen (Save, Perform, Play, Pick, Remember) can be the next verbs from the ranked list of verbs after "Publish" and "Save" that conform to the given input.

Alternatively the user can enter the second letter of her word. Since this second letter "u" can belong to the key "8tuv", the list of verbs can be updated so that only those first parts that match both inputs are selectable, i.e. only those verbs are presented that comprise the first letter from the first key "7PQRS" and the second letter from the second key "8tuv". The list of these verbs is presented on the screen 5-25: Publish, Quit, Start, Pull, Push, Stuck. Now Jill has chosen her verb "Publish", meaning that the pointer or other emphasizing element or accentuation, like inverse-style characters emphasize the verb.

After accepting the verb "Publish", the screen 5-24, 5-25 changes to show some object parts, second parts of the objective statement, view 5-26. The object parts are preferably offered in such order that independent object parts that have association with the accepted verb are offered first and if they run out, other independent object parts are offered. If also these run out, dependent object parts that are usually expressed right after the verb are offered and if these run out, other dependent object parts are offered. However, the user does not have to preferably do anything in order to switch between selecting independent or dependent object parts, but he/she can merely leaf through the offered selectable-parts e.g. by scrolling. In other words, the object part selection and acceptance stages 7-8, 7-10, 7-14, 7-16, 7-18, 7-20, 7-22, 7-24 constitute one logical selection stage from the user's perspective. When Jill has accepted "photos", she has accepted the objective statement comprising two parts. Prior Jill accepting the objective statement, it can however be specified even more as can be seen from the views 5-27 and 5-28, where Jill can select that she wants to publish "photos of a person" and that the person is "John Jr". This can be done e.g. by Jill using a key that is dedicated to inclusion-command, that includes e.g. a next character, word or larger part of currently chosen selectable-part to user input as if the user had inputted the character(s).

The last two views 5-27 and 5-28 give an example of how hyperonyms in objective statements can be substituted with personal information. This can be implemented by stating that given word(s) of object part constitute a hyperonym, and preferably defining the type of information by which it can be substituted. This can be made together with mentioned filtering of private information in such a way that names can be substituted by e.g. a pronoun or the word "person" and addresses e.g. by a word "location", "place" or "address". When user accepts these objective statements, the substitution can be made to reverse direction by offering information of suitable type from the user's personal database(s).

Aside from enabling the use of personal information in objective statements, this two-way substitution also makes it possible to better rank this kind of objective statements based on their usage information. When offering the personal information like e.g. names, the information can also be presented in ranking order based e.g. on the frequency of use of said information in general, or the frequency of usage in given objective statement. Also other information associated to said personal information can be fetched from personal database and used then e.g. when calling the service. The fetching can be made automatically based on e.g. the service description. This way for example a WWW-postcard can be sent to the right email address of a person after user selecting his/her name, without need for further user annoyance.

The presented list of verbs and object part(s) of the objective statement can be e.g. in alphabetical and/or in weighted order, to be presented in some ranking order. Also the verbs and/or second parts and/or services can be listed as the more frequently used the higher it is ranked. As another possibility when the verb is entered object parts and/or services are presented on the screen.

In another example as shown in FIG. 5B the user wants to read news by the mobile phone. Five text rows are reserved for the inputs on the screen. In the step 5-4 the user sees the verb "Read" and he enters the command "Down" e.g. by a keypress. Then the list comprising the first parts of the objective statements moves upward so that the verb, which was first disappears and a new verb comes into view 5-6. The other possibility is that the pointer pointing to the chosen, pre-accepted, verb moves downward 5-8. When the pointer is at the end of the list more verbs can then be scrolled to become visible. Next 5-10, 5-12, 5-14 the user accepts the first part of the objective statement "Read" e.g. by a key dedicated to acceptance function, after which the user sees the second part of the objective statement, "news", and can enter the command "down" twice to be able to reach "news". After this the user can proceed e.g. to three different views. On the first view 5-16, the user has accepted the object part "news" and thus the objective statement "read news" and he is offered a list of possible services to which the accepted objective statement refers. Based on the list the user can choose and accept the service. On the second view 5-18, the user has accepted and included the object part "news" as his input and he is offered a list of selectable-parts that stem from independent and dependent object parts as follows.

First texts that form an independent object part with the text "news", i.e. there exists independent object parts "news about sports" and "news about technology", can be offered. The user could have reached these by scrolling further, without including the text "news". Of these those independent object parts that form existing objective statement with the verb "Read" can be offered first. After these those independent object parts that start with text "news" but do not form existing objective statement with the verb can be offered.

After independent object parts have run out, those dependent object parts that are usually expressed after another object part can be offered. These can be ranked at least partially based on the weights 3-8. The weights can be based on overall usage information of many users but personalized for individual user. The user could travel a lot and thus "at airport" could have been used by him several times, personalizing the weight associated to it. Also other possible ranking criteria can be used. For example those object parts that have similitude-relation with independent object part that forms existing objective statement with the accepted verb can be ranked higher than those that do not. For example object part "about politics" could have similitude-relation with object part "about sports" based on the facts that they have same word and the word exists in same place of object parts.

It should be understood that the order of offering object parts here is only an example for keeping the objective statements intelligible and helping the user to express them effortlessly. This order can be varied in many ways.

On the third view 5-20 the user has proceeded directly to the service. This could mean e.g. that the service was ranked as number one service and/or the service was associated e.g. via service description with the information that it should be offered immediately, without user further acceptance and the user has accepted this earlier e.g. via preferences-setting.

As still another examples can be mentioned: "buy new shoes", "turn sauna on" and "obtain patent".

As can be seen, relatively complicated function is easy to reach by entering relatively small amount of inputs with the help of the user interface UI according to the invention and its embodiments. What is even more important is that the user can find almost always the service in his own intuitive way. Since it is highly probable that many other users have also wanted the same service or the service, which relates closely to the wanted service, e.g. a service which automatically publishes given photos on Internet, and at least some of them would have expressed their objective as "publish photos" before Jill, this would have created the objective statement preferred also by Jill to the system according to the invention and its embodiments.

In one method of the invention and its embodiments, at least some of the objective statements can be listed completely for the user to see them. Additionally the screen area used by the user interface can be divided into at least two parts. The ordering of objective statements listed in the first part can be done dynamically, while the ordering of objective statements in the second part can be more static. These different parts can reflect the different aspects of the usage probability of the objective statements. The static ordering can reflect those aspects of use context influencing the usage probability that do not change very often. These can be e.g. the device or the user in question. The dynamic ordering can be done according to above-mentioned weights that reflect the dynamic aspects of usage probability, the relevance of the objectives at the given situation and/or the relevance for the user. The relevance can be e.g. time and/or position and/or money and/or personal interest based.

In addition, promoted objective statements can be shown on dynamically ordered part of the screen. As promoting is decided according to some rule, like closing time limit, or triggering signal, promoted objective statements are also likely to be relevant for the user at the time of promotion.

The firstly ranked verb of the static or the dynamic set of the objective statements can be pre-accepted, i.e e.g. the cursor is placed on the verb. This can give the user necessary comprehension for distinguishing the difference between the static and dynamic parts of the screen.

When the verbs and/or objects and/or services are offered to the user, they all can be different or some of those can be different. This means that e.g. only different verbs are presented or only different objective statements are presented or one verb is presented with different object parts and or services associated with it. Another example is to present the same verbs with different object parts or the same object parts with different verbs.

For the acceptance of the objective statement, many different methods and their combinations can be offered. The first method can be above described selection in stages so that in first stage the verb is accepted and in the second stage the user is then presented with a list of objective parts that are associated to said verb. Additionally the user can preferably shortcut to accepting the whole objective statement at once. This second acceptance method can be particularly beneficial for routine-like acceptance of objective statements that are presented on the static part of the screen. It is also possible to offer to the user the both methods at the same time, e.g. to the same user interface.

For the service acceptance, different possibilities can also be used. These comprise the straight acceptance of service/functionality associated with the objective statement, and accepting the service from the set of services associated with the objective statement.

Incremental search can also here be used for finding the needed objective statement. This means in other words the possibility to choose the objective statement by writing its beginning, ie. the beginning of the verb in the first stage of selection and the beginning of the object part in the second stage of selection, and updating the presented texts accordingly, as already described above.

By combining this way presentation of objective statements in statically and dynamically ordered areas and presented different selection methods, users can reach large number of different objectives of various levels in very easy and efficient way and within the same integrated user interface be informed about the objectives that are somehow relevant at the given moment.

Figure 9:
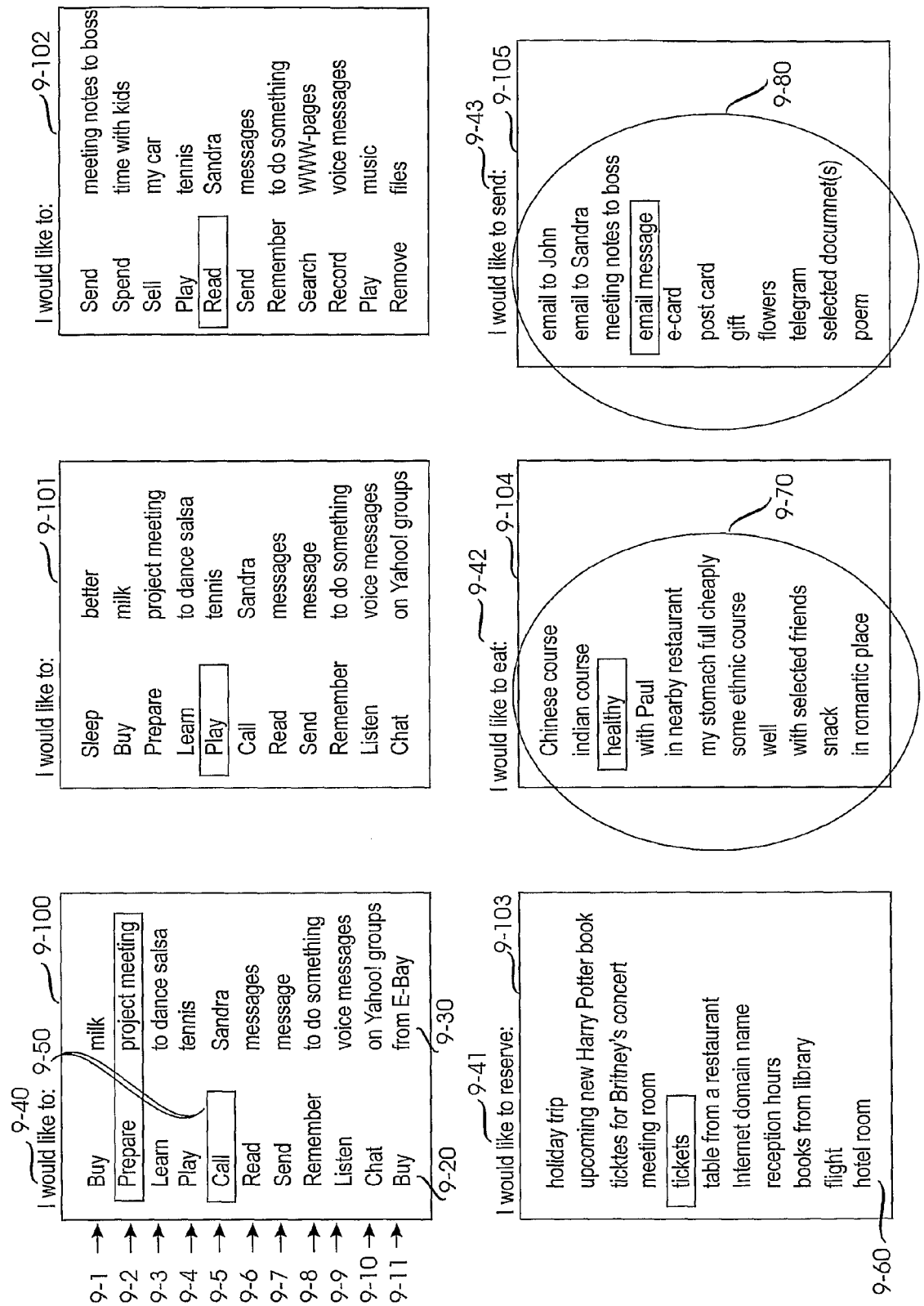
FIG. 9 shows different views of the user interface when establishing the objective statement.

FIG. 9 shows different possible views 9-100 to 9-105 of the user interface when establishing the objective statement. As described above, the objective statements start with the verb and are easily interpreted by users as objectives that they may choose. The special property of the objective statements is that they are easily comprehended by users e.g. as long-term objectives or immediate objectives that may be reached via device functions or other services. As stated earlier, to help the user to establish the objective statement there can also be different helping phrases 9-40 to 9-43 like "I would like to".

In FIG. 9, one of the presented verbs 9-20, namely 9-50 "Call" is pre-accepted. This can be indicated e.g. by inverting the font colour representation. The pre-accepted verb can at the same time also indicate one of the objective statements 9-30, 9-60, 9-70, 9-80 as they are on the same line 9-1 to 9-11 or otherwise visually connected. This means that pre-accepted verb could be said to indicate pre-accepted objective statement. Thus by providing two different selection methods to the user, the objective statement can be accepted either by accepting the whole objective statement at once, or in stages by accepting the verb first and the rest of the objective statement from a list of associated object parts secondly.

In FIG. 9, the dynamically ordered objective statements 9-1 to 9-4 are situated on the upper part of the used screen area and the statically ordered objective statements 9-5 to 9-11 are situated below them. In this example, the statically ordered objective statements reflect the probabilities of usage of objective statements when the used device is the mobile phone. Thus it can be said that in this example the statically ordered part of the screen is customized for mobile phone.

The user can understand the division of the screen to statically ordered and dynamically ordered parts from the fact that in the initial stage the pre-accepted verb is set to indicate either first of statically ordered objective statements (item 9-5 in FIG. 9) or first of the dynamically ordered objective statements (item 9-4 in FIG. 9). The ordering of objective parts can be in descending order from the initially pre-accepted verb and objective statement. Thus in FIG. 9 the statement "Buy milk" is ordered lower than the statement "Prepare project meeting" in the dynamically ordered part. Correspondingly he statement "Listen voice messages" is ordered lower than the statement "Send message" in the statically ordered part of the screen. Thus the user can choose the objective statements with highest ranking most easily and rapidly when using e.g. cursor keys for the choosing. In case the user is provided with e.g. a pointing selection facility, the choosing difficulty of visible objective statements is even lower.

The objective statements being statically ordered can imply that between different usage times of the user interface, the order can be the same. Thus, when the user starts from the initial stage of the user interface, he can rely on finding the same objective statements in the same way he did earlier. This allows the selection of the objective statements to work in command-like manner, where the same user input leads to the same functionality between different usage times, which enables routine-like usage. However, the static ordering does not mean that the ordering does never change, but that the changes are infrequent and/or a result of deliberative changing from the user or other human maintainer.

The objective statements being dynamically ordered can imply that the ordering can change dynamically, between different usage times and also during one same usage time of the user interface. Thus for those objective statements that the user does not see, the user can not predict exactly the input, e.g. keystrokes, that are needed to choose the objective statement from the dynamically ordered part of the screen. Because the dynamical ordering of the objective statements however can be made according to the probability of use in the current use context, the user may many times find the needed objective statement quicker from the dynamic part of the user interface. Furthermore, the dynamic part enables a sensitive informing of the user about the objectives that likely have become relevant to the user, because they are promoted.

This is important because informing user sensitively, without disturbing him, about possible objectives he could like to reach at the situation, is one of the central problems of user interfaces, especially within mobile devices.

As explained in above examples, the user can first accept the verb e.g. by pushing the reserved acceptance key, and then proceed to choose and accept the associated object parts. Alternatively, the user can accept the objective statement as a whole, directly by choosing the verb to indicate the to be accepted objective statement and performing the acceptance function straight, by e.g. a different acceptance key or by pushing longer the same key as used for acceptance of the verb only. This latter acceptance method can be called the short-cut acceptance.

As can be seen from FIG. 9, the first one of the objective statements on the statically behaving area, namely "Call Sandra" 9-50 is available for short-cut acceptance, because the associated verb "Call" is pre-accepted. Now the user can accept the statically behaving objective statements consistently, without even looking to the screen. In this case the choosing can be done e.g. by the cursor-down key and/or by giving letters via the keyboard, by handwriting or by speech. On the other hand, the user can as easily choose the objective statements from the dynamically behaving area, just by using the cursor-up key, when in this example the screen could be updated from 9-100 to that of 9-101. If user does that, more dynamically behaving objective statements can be rolled into view and thus the dynamically behaving area grows and statically behaving area shrinks. If the user inputs characters, the statically and dynamically behaving areas can be as large as they were when user started to input characters. Another suitable option for pre-accepted objective statement is that it can be the firstly ordered of the dynamic area's objective statements, in this case the objective statement "Play tennis". After that the user can reach the static area always by a single key-down click, but the first objective statement to choose can be dynamic, allowing one click acceptance of it. This would be beneficial for the situations, where the user is e.g. reminded via the user interface.

If the device supports selection by pointing, the short-cut acceptance accepting whole objective statement at once can be done by pointing to the object part. The verb could be accepted by pointing to it, leading to acceptance in stages.

In one example, the user wants to express the objective "Reserve a table from a restaurant" and share the objective with his friends. He expresses the objective by pressing the key "pqrs" on his mobile phone, and the information about this is sent to a verb-database handler. The verb-database handler can send back a set of those verbs that conform to the user input "pqrs", and the view is updated to reflect this, 9-102. Because "r" and "s" are both very common starting letters in English verbs, the user can still not see the word "reserve". Thus he can press the "def" key, and the information about this is transferred to verb-database handler in the same way as earlier. The verb-database handler can send back a set of those verbs that conform to the user input "pqrs"+ "def". The user inputted letters can also be enhanced e.g. by bolding them, in order to make the input process easier.

After that the user can accept the verb "Reserve" by choosing it as pre-accepted by using e.g. cursor keys and pressing stage acceptance key. If the initially viewed objective statement had been the one user wanted to express, the user could have done that by performing the short-cut acceptance instead of the verb-acceptance. After accepting the wanted verb, the user can be presented with a view of possible object parts 9-103 that with the accepted verb form together the sensible objective statement. The logic is similar to the first search stage so that the view can be divided to the statically and the dynamically behaving parts. Thus also the second stage of objective statement acceptance can be used to inform the user about the objectives that could be somehow relevant to him at the time.

The verb-database handler and the objective part-database handler may be on the same device as the user interface or they may be accessed over the network. The databases may reside at the mediator and be at least partially copied to the user device.

If the user does not find suitable objective part, he can keep on writing characters and the written text can become the new objective statement. The user can also use existing objective statement as a template so that he can advance the cursor to the point where the objective statement that he wants to express starts to differ from the pre-accepted objective statement and continue writing from that point on. In this way the process of expressing the new objective statement is tightly integrated with the search process in such way that the users do not have to cognitively separate them.

When statically and dynamically behaving areas are integrated, it becomes apparent that the priority of those objective statements that the user has seen on the statically behaving area, can be made so low on the dynamically behaving area that the user is not bothered with them. On the other hand, all objective statements available at least in local database can be reachable from both areas. The requirement for the consistency can diminish for objective statements, which the user has not been accustomed to reach with certain keystrokes. This means that the number of statically behaving selectable-parts, i.e. the objective statements, the verbs, the object parts or the service titles, can be limited and dynamically behaving selectable parts can be offered also on what was initially statically behaving area, after the statically behaving parts have run out. In order to support the user cognition, some indication like slightly different typeface or background colour can be used to make the difference between the selectable parts behaving statically vs. selectable parts behaving dynamically. Preferably the user can be offered means for adding the statically behaving selectable parts to the position of his choice. This way the user can use the static behavior as a kind of bookmarks or "favorites" for reaching objective statements and services that he likes to find most easily.

For statically ordered part it is not preferred that there are in general the same verb or the perfect synonym in the view twice or more. This can guide the user to use phased search by accepting the verb first. When forming the default ranking statically behaving objective statements it can be taken into account how often the users are supposed to accept the verb of the objective statement given in the device the user interface is used on, and which whole objective statements users are supposed to accept most often.

The services presented to the user after accepting the objective statements can be the same, or at least partially the same, regardless of were said objective statement chosen and accepted from the statically or the dynamically ordered objective statements.

The user interface can thus provide from the user point of view logically coherent means for speedily reaching services for almost any kind of objectives he might have in mind and keeping informed about objectives that he might need to be aware of at the time. On the other hand, taking away any of the listed functionality can waste the point of using the user interface of the invention and its embodiments for informing the user, as the informatively presented objective statements may not be integral and logically coherent part of the multipurpose user interface, and may thus be easily experienced as disturbing factor by users.

The following examples are only some possible examples to show how the invention and its embodiments can be used to inform the user about the relevant objectives for several reasons. The objective may become relevant to the user e.g. because:

- a deadline for reaching the objective (or advancing it) is reaching;
- the user has set the objective as active and the situation at hand somehow enables the reaching or advancing of the objective like e.g. the location of the user or the user device;
- the objective becomes or is offered as shared by other user(s);
- new information or services concerning shared objective is published by others; and
- some other user or service provider publishes a service or a content to the user and it is connected to the objective, e.g. "See photos of Jr's birthdays".

These are described in more detail in FIGS. 10 to 17, where signal charts representing some typical usage scenarios are presented.

All these different reasons for informing the user can be made distinguishable from each other, when the objective is viewed, e.g. by the use of a different backscreen colour. This serves for the purpose that users can learn to expect that the first available service after accepting the objective statement in question will be of certain type and can more easily e.g. shortcut to using the service in question without choosing among other services. In one embodiment of the invention, in addition to the above-mentioned informative purposes, the dynamically behaving part of the screen can be used for allowing the user to find the objective statements more rapidly than is often possible by using the statically behaving part of the screen. This can done e.g. by ranking and ordering the objective statements by using above mentioned weights. Weights can reflect e.g. how often the objective statement has been accepted by the user himself in somehow similar situation; and/or how often the objective statement has been accepted by others in somehow similar situation.

It is also possible to integrate the shared objectives and the immediate objectives. In one embodiment of the invention, this is used as a way for the group of users to contribute their shared objectives and being aware of its status.

In this embodiment a member of the group can first express the objective, e.g. "Plan holiday trip". The objective can then be delivered to the mediator, and shared from there to other users' devices. In some cases, the delivery of the objective statement can also be done straight from one user to another.

The mediator can then examine, if the objective statement is new to the system, or if it has existed previously. If the objective statement exists already and has the services linked to it, at least some of those links can be transferred to the users. If the objective statement has not existed, but the similar objective statement, e.g. counting from the beginning, did, and it has services linked to it, at least some of those links can be transferred to users.

Because the invention steers the users to use existing objective statements, the objective may well be already linked with some services. Thus the members of the group may have readily available services and the content that may help them to reach the shared objective, and they can emphasize those links that are most suitable for the situation from their perspective. The emphasizing can be done by altering the ranking of said links and delivering information about this to other users' terminals.

Another advantage of the invention is that the users can also link new services to the objective statements and publish them to the other users, and that they can be sensitively informed about the availability of these new services.

In one embodiment, the user can also be given means, e.g. checkboxes, to express, for which group(s) the service is relevant. The service will then be linked to the objective statement in question for only those groups. Linking services can comprise linking content or creating content and then linking it.

The presented functionality makes it possible for the users and user groups to gather and access all services they need from the same user interface. They can then use them for reaching immediate objectives, like device functionality. Users can be kept informed/reminded about their top priority objectives, while using the user interface for any purposes.

Additionally, the users can browse the dynamic part of the user interface to see more objectives that are most likely relevant to them.

Figure 10:
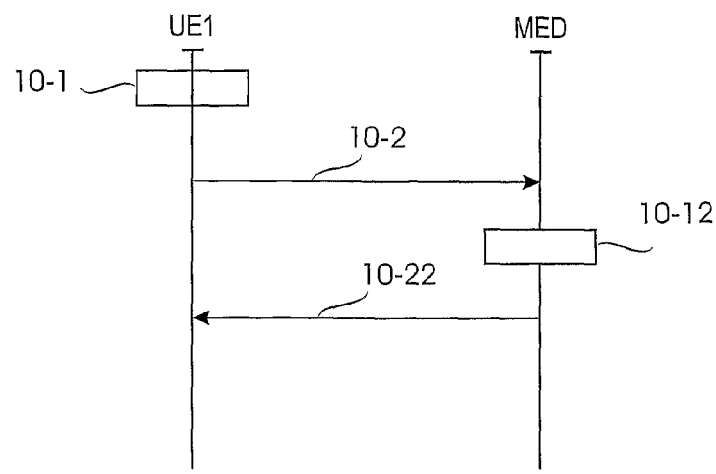
FIG. 10 is a signal chart of one embodiment of the invention showing how to promote the objective statements.

FIG. 10 is a signal chart of one embodiment of the invention showing one possibility to promote the objective statements, i.e. to show dynamically, changingly the objective statements to the user in some part of the user interface. In the embodiment the user chooses the objective statement and later the objective statement is promoted to the user.

In step 10-1 the user has indicated the objective statement and the user does some function, which causes the promotion of the objective statement. The functions can be e.g. "remind about the objective" or "make the common service request". In step 10-2 the information on the objective statement to be set promoted is transmitted to the mediator MED. In step 10-12 it is decided in the mediator that the objective statement is to be promoted and after that in step 10-22 the information on the promotion of the objective statement is transmitted to the user equipment UE1 (see FIG. 7, steps 38 ja 40).

Figure 11:
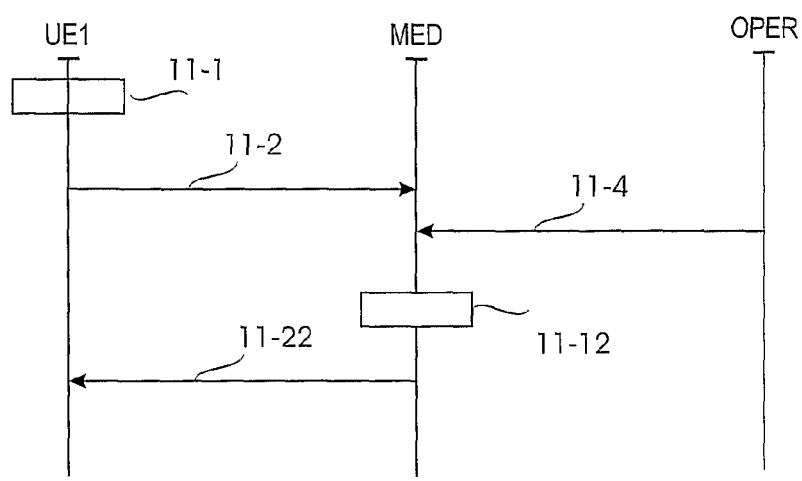
FIG. 11 is a signal chart of one embodiment of the invention showing how to promote the objective statements.

In one example according to the FIG. 10 the user can choose the objective statement e.g. "Buy present to Sandra" and a time limit. The mediator decides, when there is a good opportunity to buy the present and depending on it and the time limit decides the appropriate level of the promotion and transfers it to the user equipment. It is to be noted that the mediator in this embodiment does not have to be necessarily the same mediator as that in FIG. 4. FIG. 11 is a signal chart of one embodiment of the invention showing how to promote the objective statements. In this example the user wants step 11-1 to be noted of some objective statement in an appropriate location. Thus in step 11-2 the requirements of the promotion and the information e.g. on the location is transmitted to the mediator. In step 11-4, which step can be repeated e.g. periodically, also the information on the location of the user equipment is transmitted to the mediator. After that the mediator follows the location of the user equipment and its vicinity to the defined location(s) in step 11-12. The location can be coordinates or a logical information e.g. a grocery. The mediator and the operator can be the same party or the described process 11-12 can occur in the operator's site.

In one example the user chooses the objective statement "Buy milk" and "grocery" as the location. This information is sent to the mediator in step 11-2. The mediator has the information on the locations of the groceries as coordinates, and these are compared with the coordinates of the user equipment in step 11-12. When the coordinates are close to each other the information on the promotion is sent in step 11-22.

Figure 12:
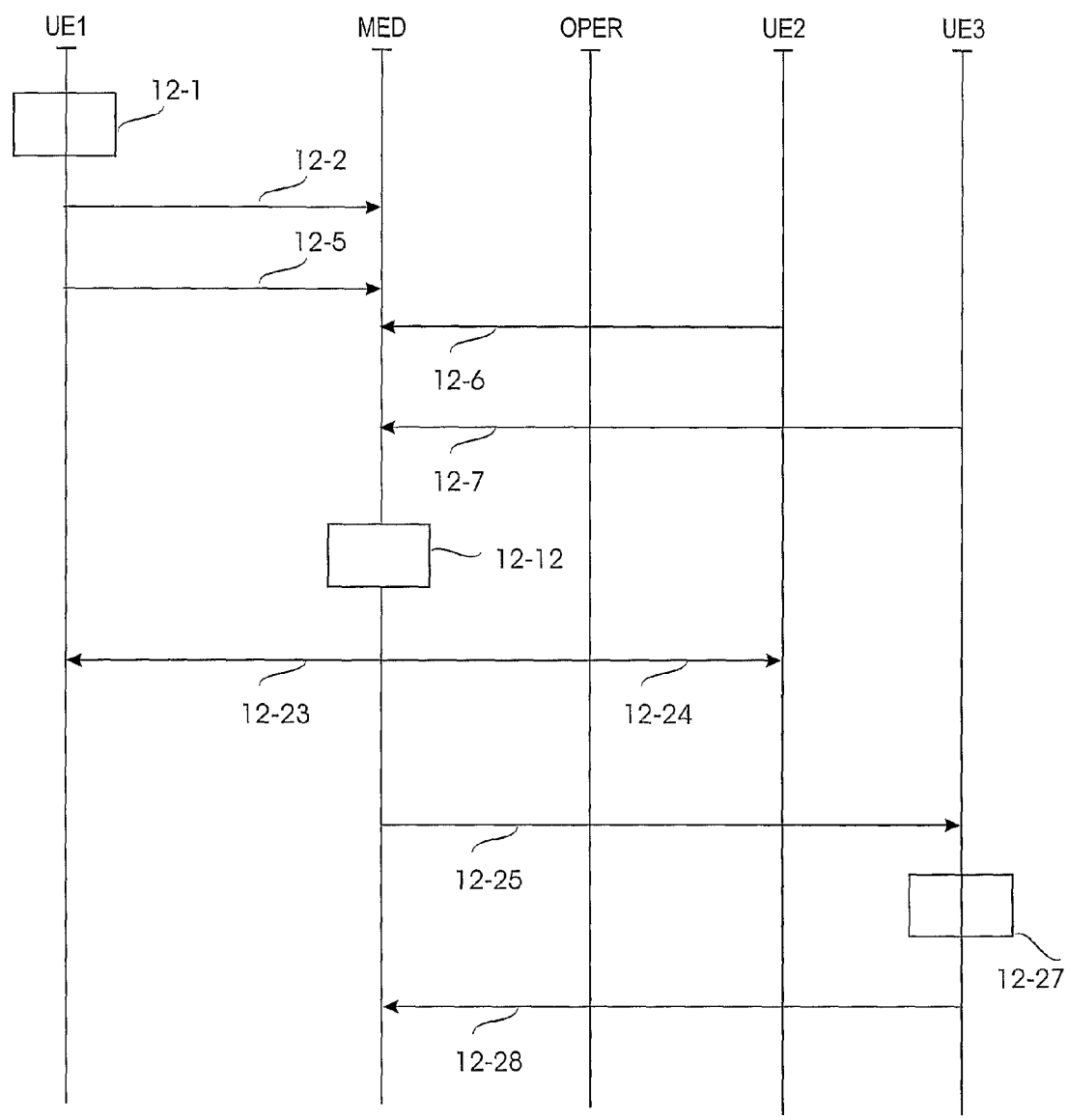
FIG. 12 is a signal chart of one embodiment of the invention showing how to promote the objective statements.

FIG. 12 is a signal chart of one embodiment of the invention showing how to promote the objective statements. In it one user wants 12-1 to share the objective statement with the group, and the objective statement is promoted in such a location where the objective represented by the objective statement is reachable. In this embodiment the user equipment tells its location.

In step 12-2 information is transmitted from the user equipment UE1 to the mediator. The signal comprises of promotion information and information about the group to whom the objective statement is to be sent. Additionally the signal can comprise information about the location where the objective statement can be reached, like in previous example. In steps 12-5, 12-6 and 12-7 the information on the locations of the user equipment UE1, UE2 and UE3, respectively, is transmitted to the mediator. After that the mediator can follow the closeness of the users' equipments from the defined location in step 12-12.

If only one user equipment is in the location close enough to the desired service, the information on the promotion can be transmitted to that user equipment UE3 only in step 12-25 and other signals 12-23 and 12-24 can be omitted.

The user UE3 with the promotion information can choose in step 1227 the promoted objective statement and mark the common objective as reached. After that the information is transmitted to the mediator MED in step 12-28, after which the information about ending the promotion can be sent 12-30 to 12-34.

In one example the mediator can already have the information on where the objective is reachable and thus the step 12-2 does not comprise that information. It is thus possible for the mediator to know the locations where some objective, like "Buy Milk", is to be reached at best.

Figure 13:
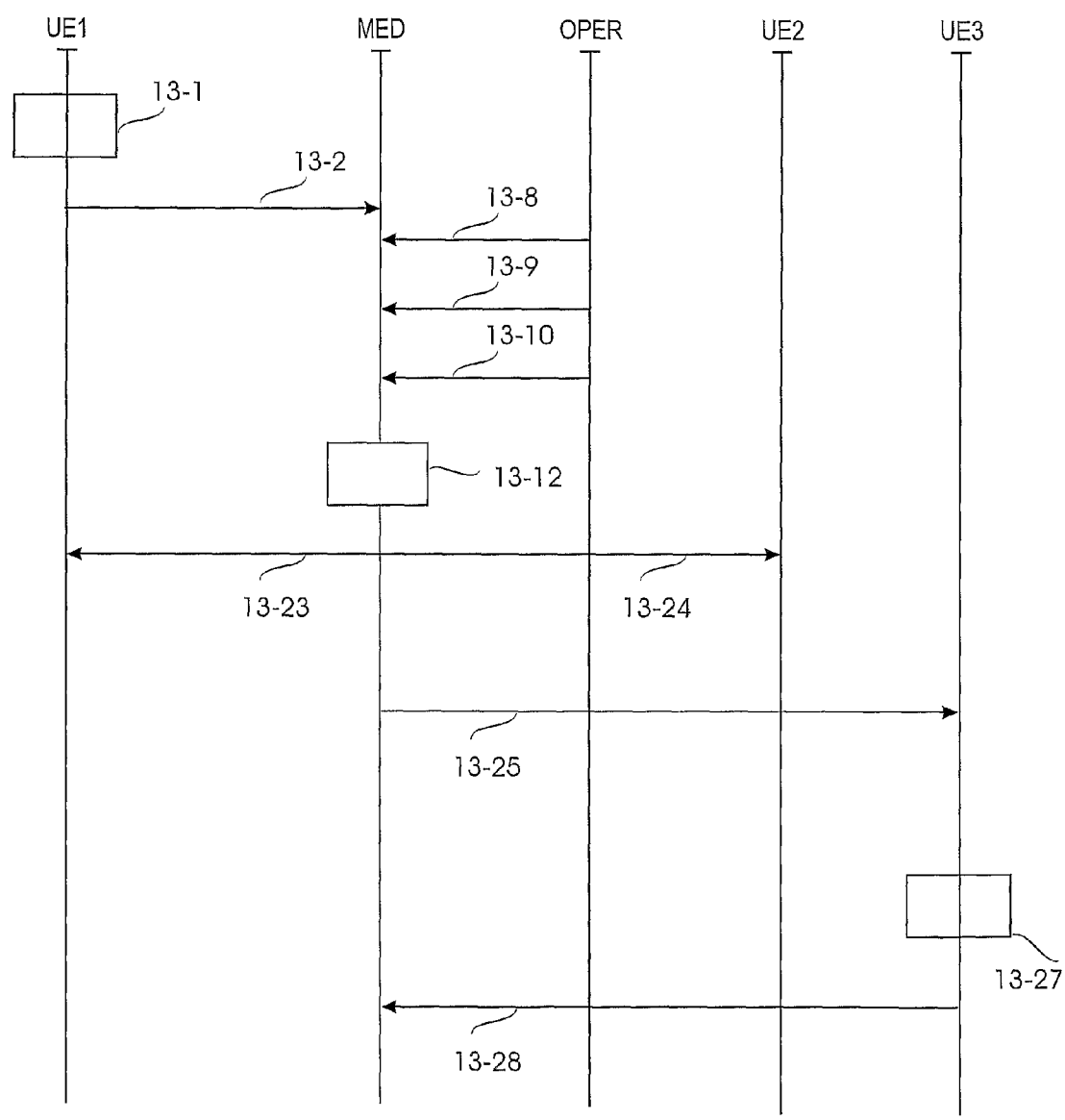
FIG. 13 is a signal chart of one embodiment of the invention showing how to promote the objective statements.

FIG. 13 is a signal chart of one embodiment of the invention showing how to promote the objective statements.

In this example the location information of the users comes from the operator(s) in steps 13-8, 13-9, 13-10. The operator can obtain the information on the basis of the used network technology, like the location of the cell as cell location in GSM (Global System for Mobile Communications), in GPRS (general packet radio service), in Bluetooth, or in WLAN (wireless local area network) system. Alternatively the GPS (Global Positioning System) information can be transmitted from the user devices to the operator, e.g. for efficiency or security reasons. Steps 13-12 to 13-28 corresponds to those of FIG. 12: 12-12 to 12-28.

Figure 14:
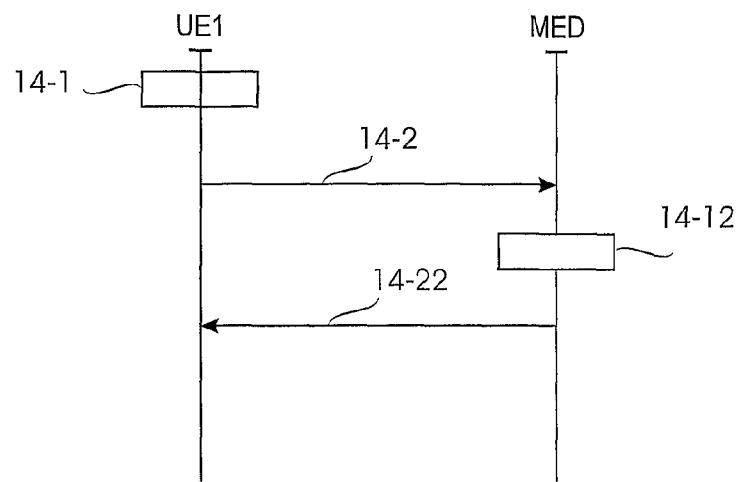
FIG. 14 is a signal chart of one embodiment of the invention showing how to promote the objective statements.

FIG. 14 is a signal chart of one embodiment of the invention showing how to promote the objective statements. In it products or services, which are thought the user is interested in, are advertised to the user discreetly via the objective statements. The user expresses his objective statement and can define it as valid for some time period or can define it to be a long-term objective. After that in step 14-2 the information on the objective statement and definitions expressed by the user is transmitted to the mediator. In step 14-12 it is decided that sub-objectives for the valid objective can now be promoted. This can be done e.g. with the help of the hierarchy between the objective statements defined in the mediator. In following step 14-22 the information on the promotion is sent to the user equipment.

In one example the user expresses the objective statement "Construct a house". The mediator has the information that one sub-objective of the objective statement "Construct a house" is "Buy construction materials" and this will be promoted to the user. This can be done e.g. when in vicinity of store selling construction materials.

Figure 15:
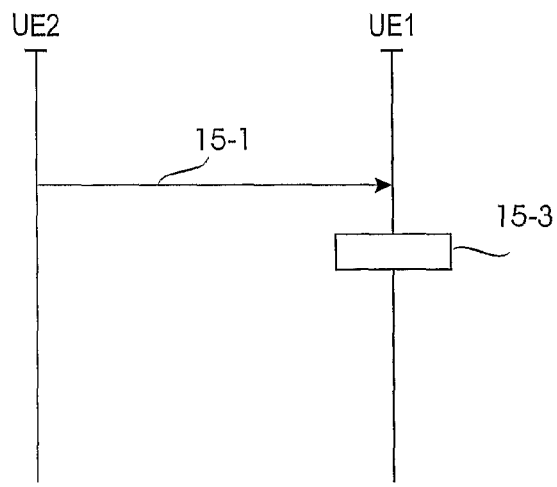
FIG. 15 is a signal chart of one embodiment of the invention showing how to promote the objective statements.

FIG. 15 is a signal chart of one embodiment of the invention showing how to promote the objective statements. In this embodiment the message of another user causes the promotion of the objective statement. In step 15-1 the user UE2 sends a message for the user UE1. The message can be e.g. an email, a chat call or a short message. In step 15-3 the objective statement is promoted to the user UE1 on the basis of the arrival of the message like "Respond to call" or "Read email from Sandra" or "Read new short message". The promoted objective statement can be formed based on the type and/or content of the received message.

Figure 16:
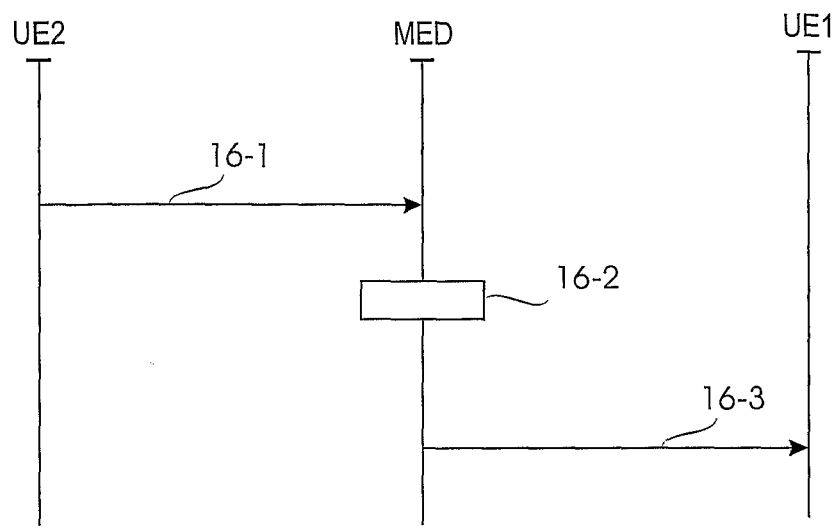
FIG. 16 is a signal chart of one embodiment of the invention showing how to promote the objective statements.

FIG. 16 is a signal chart of one embodiment of the invention showing how to promote the objective statements. In it the user UE2 publishes a service for the user UE1. In step 16-1 the signal is send from the user equipment UE2 to the mediator. The signal comprises information, which makes it possible to reach the service to be published, like the address of the service or a possible password or a code.

In step 16-2 the mediator establishes the objective statement to the recipient of the service according to the information of the signal 16-1. In step 16-3 the mediator sends the information on the promotion of the objective statement according to the service to the user equipment of the user UE1.

In one example the user UE2 wants to publish photos and he expresses the objective statement "Publish photos of Jose's birthday". The mediator sends the objective statement "Watch photos of Jose's birthday" for the promotion. The mediator can translate the originating objective statement to be promoted objective statement e.g. by beforehand defined associations between objective statements, in this case between "Publish photos" and "Watch photos".

Figure 17:
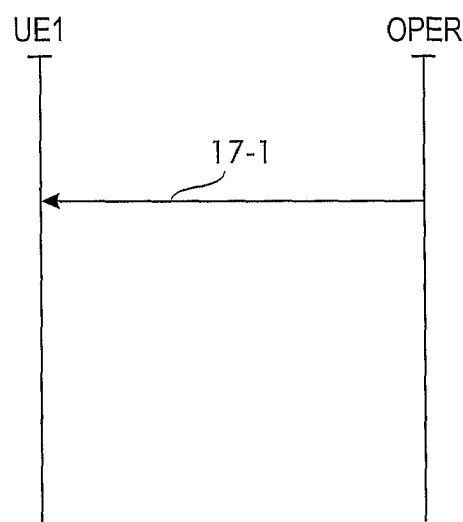
FIG. 17 is a signal chart of one embodiment of the invention showing how to promote the objective statements.

FIG. 17 is a signal chart of one embodiment of the invention showing how to promote the objective statements. It describes how to promote the objective statements directly for the user via a short range communications network as location-dependently. This makes it possible for the user to use objective menus of different companies when the user is in the vicinity or inside the companies. In step 17-1 the objective statements are transmitted to the user UE1 via e.g. a local area network, like Bluetooth or WLAN from the local operator, which objective statements describe objects that can possibly be reached on site. Along the objective statements service descriptions can be transmitted, which the user can have available after the acceptance of the objective statement.

In one example the user is moving in a shopping mall and the objective statements are promoted to him relating to nearby products. Information e.g. of the prices of the products can be delivered in the service description.

In another example the object parts of the objective statement are promoted to the user location-dependently so that parts fit to the verb already accepted by the user. The user can have already accepted the verb and the object parts of the objective statement are visible on the screen of the user interface, which parts are associated to the verb. In a big mall to verbs like "Buy" or "Read" or "Eat" dynamical listing is easy to apply: "Buy <the name of the product changes>" or "Read <names of books and journals>" or "Eat <Chinese, cheap, happy meal>".

Figure 18:
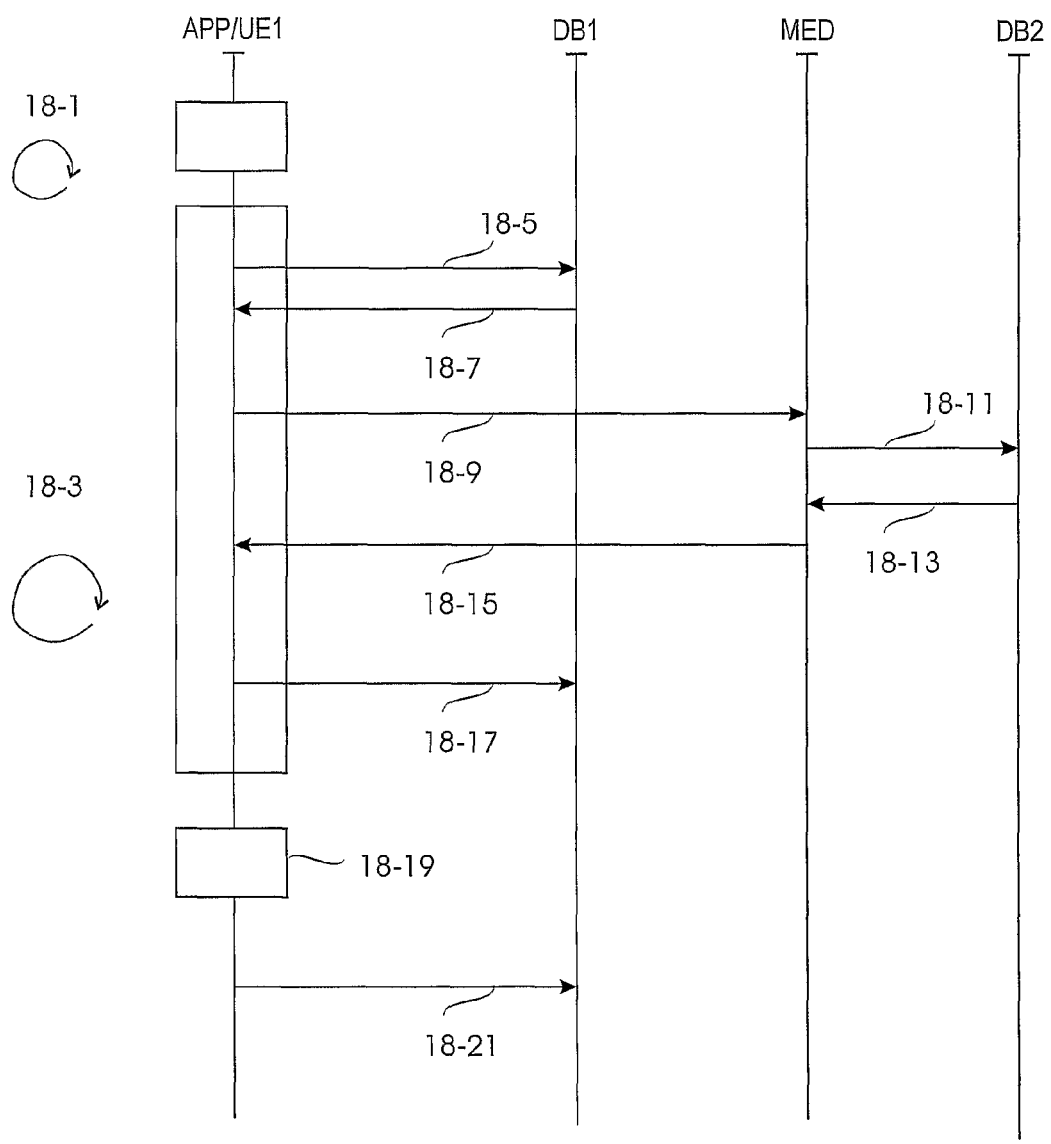
FIG. 18 is a signalling chart of one embodiment of the invention.

FIG. 18 describes a signalling chart of one embodiment of the invention. In it UE1 is the user equipment using the user interface. DB1 is a local database or a database, which is reachable via a wideband service. MED describes the mediator and DB2 is the database of the mediator from which DB1 can be a partly copy comprising personal information. The database DB2 can be large centralized database to which searches are made from time to time when the user performs acceptance of objective statements.

In step 18-1 the user chooses and accepts the verb.

In steps 18-5 and 18-7 the objective parts of the objective statement are retrieved from the local database DB1.

In steps 18-9, 18-11, 18-13 and 18-15 the objective parts of the objective statement can be retrieved for the database DB2 of the mediator, if e.g. the objective parts matching current user input are not found from the local database or if all or almost all of the objective parts have already been gone through.

In order to minimise the delays seen by the user the retrieval can be made in advance, before the objective parts have been gone through. The retrievals made in advance can be based on the probabilities of the usage. In other words, if the probabilities of the usage of remaining objective parts that match current user input is lower than a threshold level, the retrievals can be made. It is also possible to retrieve the service descriptions associated to the objective statements along with the objective parts. This is especially advantageous in the mobile networks, like in GPRS network, where the delays can be significant. In step 18-17 the information is transmitted to the local database DB1 so that it does not have to be retrieved from the database DB2 again. The deletion of information from the local database DB1 can be done by deleting information, which has the lowest probabilities of the usage.

In step 18-19 the user can choose and accept the service at least partly based on the service description of the service, which service description can comprise information on what data the user should give in order to use the service and this information can be used to create a form, which helps the user to give the information. User given information is then transmitted in the service call.

Finally in step 18-21 the information on the objective statement and the service chosen by the user are transmitted to the local database DB1 to personalize the dynamic part of the user interface. In it the usage frequency of the user can at least partly define the ranking of the objective statements and the services. At the same time also information on what data the user gave in the service description can be transmitted to the database DB1. These information can then be offered as default choice for the user for the form, when the user uses the service description next time.

There are many alternative ways for presenting the user interface of the invention and its embodiments. In FIG. 21, the user interface with a different use of the screen area tailored for the mobile phone with the small screen is shown. Also the place of the dynamically handled objective statements is different, because now they are placed under the statically handled objective statements. Furthermore, the typeface is changed to make the difference between the areas. Another difference is that due to the limited space, the object part is shown only for one objective statement for both the statically and dynamically behaving area. The separation of the areas in this way may not be preferred by everybody, because the user does not have now so explicit clues to learn about the behavior of the user interface just by using it, as she can do, when the pre-accepted objective statement divides the screen, as presented in earlier example.

The fact that the user interface has dynamically behaving parts makes the user interface to work in two-ways: The user does not merely use the user interface, but the interface also guides the user's behavior.

The following describes a more refined example of reminding the user. The described way of informing the user about the objectives that are somehow relevant at the given moment can be used to integrate the users' todo-lists with the invention in natural way, even by eliminating the need for different reminder applications completely. This is possible, because the todo-lists can be interpreted as lists of the user objectives, and thus the list of the objective statements can in general be used to present them in a compact manner. In this way the users can get direct benefit of being able to express the tasks easily and efficiently. Another advantage is that the reminding does not always have to steal the user's attention, as it can be done in phases, raising the promotion level of the objective statement in question as the set time-line comes nearer, and only alerting, e.g. by sound, vibration, tactile means or the like, if the user has not accepted the objective statement, and possibly marked it off from the todo-list, when the time is up. At the same time as user marks the objective statement for the todo-list, she can be offered means for defining the situation at when she should be reminded. The situation can be defined simply as a certain time, or more complexly e.g. as a location, a name of an event etc., or as a combination thereof. The promotion level of the objective statement in question can then be decided according to the closeness of the time-line, to the matching of the current situation to the user defined, the user defined importance level for the objective, or a combination thereof.

There can be several ways for the user to mark the objective statement for to be reminded about. One is to first express the verb such as "Remember", which can be made to behave in such a way that the default action is to allow the user to express the objective statement as usual and then mark it for the todo-list. Preferably users are also able to mark any objective statements they have expressed for the todo-list as always-available basic service, like search, asking for help, carry to the todo list.

In the following an example of informing the user of the objective relevant to the current location is described. In FIG. 9, the objective statement "Buy milk" is shown as an example of the promoted objective statement. As described above, there are several ways to promote the objective statement. For example, if the user device in question is the mobile device, its location can be sent to the mediator, which then sends the objective statement(s) and service descriptions relevant to said location to the user device. Another way is to use the close range wireless network such as Bluetooth to deliver the objective statement(s) and the associated service descriptions to the user device.

The ability to send also service descriptions based on the user location makes it possible for the service providers and/or the mediator to tailor the service descriptions and services specifically according to the situation where they are used. When taking into account that the user objective, i.e. what the user wants, is known, the tailoring can be done in much more precise manner than otherwise would be possible. This makes it possible to use the invention and its embodiments for sensitive and tailored advertising. For example, any kind of advertisement to the lines of "cheap milk" or "we sell milk" would probably be considered as dump and disturbing most of the times, if it would be sent to the users' mobile devices on random bases. This would still probably happen in most cases, even if it were known that the user is in grocery store. But if the user has himself/herself marked "Buy milk" for the todo-list, the situation is totally different. In this case the reminding about the objective is natural. Moreover, the user can have several objectives on the todo-list, which can be repetitive, and if the situation where the objective can be fulfilled is specified, the invention and its embodiments allow the user to easily get knowledge that the objective can be facilitated at time when the situation occurs.

The reminding can also be easily done within the groups of users, making the invention and its embodiments as a platform for sharing the group objectives. In the above example, if the user is given means to specify a group of people, like "family members", the objective statement can then be promoted to the group members. Preferably now, when one of the group members marks the objective off from the todo-list, like "reached", it can also be marked off from other members' lists. In this way any member of the family, who is first in or nearby the grocery shop can buy milk, without need for further coordination or communication, although e.g. the initialization of the communication to contact the member who put the objective on the todo-list can be available as a form of default service description available via the objective statement in question. The shared understanding with the mediator and the users about the objective is needed, and the form of the objective statement supports this.

Figure 19:
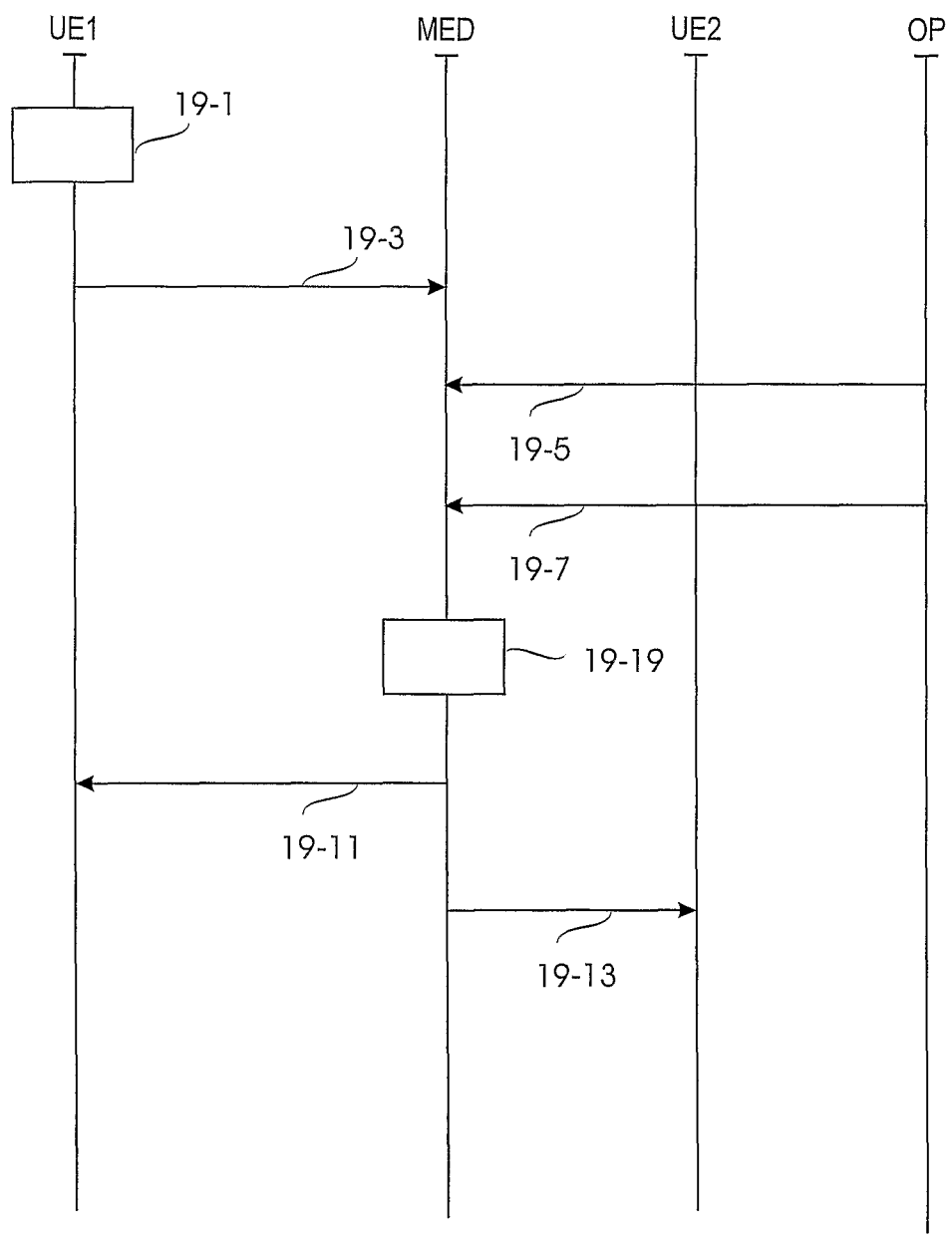
FIG. 19 shows an example of the group promotion.

FIG. 19 shows an example of the promotion to the group at least partly based on the location of the members UE1 and UE2 of the group. In step 19-1 the user has chosen the objective statement. In step 19-3 the information that the objective statement is to be put on the todo list of the group is sent to the Mediator MED. Also the information on the location the user wants the objective to be promoted can be sent. In steps 19-5 and 19-7 the information on the locations of the user equipment is transmitted from the operator OP to the mediator. The location can be the logical location like the location of the grocery. How close and/or precisely the coordinates of the user group match the coordinates of the expressed common place can be checked by the cooperation of the mediator and the operator. This can be done when the operator knows the coordinates of the users e.g. with the help of the GPS system. Thus the information on the coordinates or the match to the certain logical place can be ordered from the operator.

In step 19-9 the locations of the user equipment are compared with the defined location of e.g. the grocery and in case of a hit the information on the promotion of the objective statement is transmitted to the user equipment in step 19-11 and 19-13.

In an alternative solution the mediator can have an register about what objective statements are related to different locations and the promotion happens at least partly based on this information. In this case the user does not have to separately inform the location to the mediator, because it can be obtained from the operator. The mediator can also learn the connection of the objective statements to a certain location e.g. by following where the users mark the objective off from the todo-list.

Figure 8:
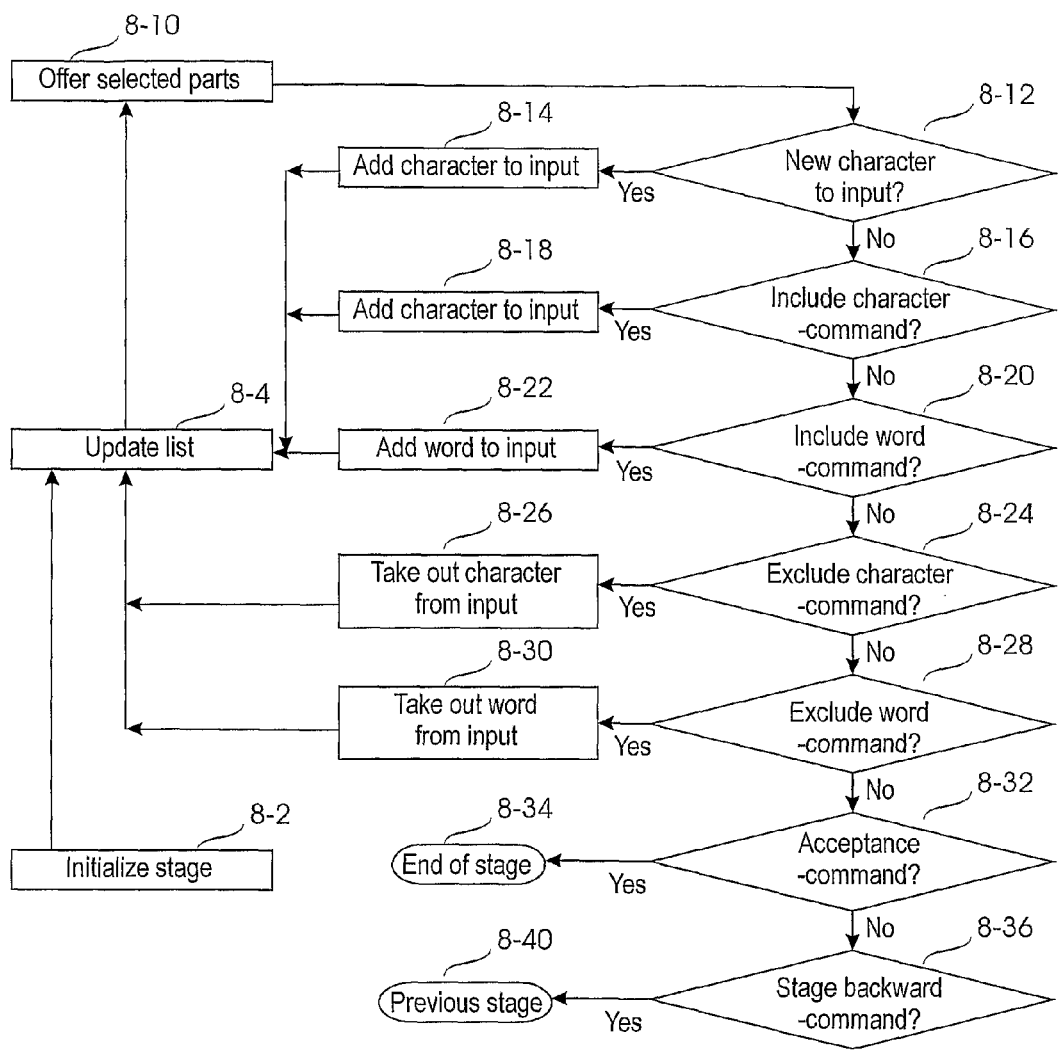
FIG. 8 shows a more detailed example of possible implementation of getting user input.

In FIG. 8, a more detailed example of one possible implementation of getting user input is given. The flowchart illustrates one stage of input process, i.e. the acceptance of the verb or the object part. Possibly also a service name, and thus the service, can be accepted in the same manner.

In step 8-2, the stage is initialized and input for this current stage is empty string. This input can be defined as an stage-input, i.e. the stage-input forms verb or object part, when user accepts it and moves to the next stage.

In step 8-4 the list of selectable-parts offered to the user is updated according to stage-input received so far. For example in object part acceptance stage, selectable-parts can be offered in the order that has been described earlier. Furthermore, if the stage-input received so far constitutes one or more word(s) in addition to currently inputted word, but there does not exist selectable-parts that match earlier than currently inputted word, those selectable-parts that match only the currently inputted word can be offered. In FIG. 7, step 8-4 relates to steps 7-8 and 7-16 in object part acceptance stage, to step 7-2 in verb acceptance stage and also possibly to stage 7-30, if acceptance of the service is done by choosing from a set of services viewed at once to the user. Another possibility for service acceptance is e.g. that services' textual descriptions are viewed one at time to the user and user either accepts the viewed service or views the next description.

After the list is updated, the selectable-parts are viewed to the user in step 8-10 and user input is waited.

In step 8-12, if user input has been a character, the character is added to stage-input in step 8-14. The input may also be a plurality of characters, like mentioned earlier, and in this case a list of possible inputs can be maintained instead of one possible stage-input.

Otherwise in step 8-16, if user has given include character—command by e.g. pressing cursor-right key, the next character of currently selected selectable-part is added to stage-input in step 8-18. The inclusion preferably sets the above-mentioned list of possible inputs discarding those possibilities, which do not match the currently included character(s).

The inclusion can also be done e.g. a word at a time, in steps 8-20, 8-22. Also other possible commands, like inclusion of all words currently shown can be implemented.

A reverse operation for inclusion of character is exclusion of character, steps 8-24, 8-26. Then the last character of current stage-input can be discarded. Like inclusion, exclusion can also be done e.g. a word at time, steps 8-28, 8-30.

If user gives acceptance-command, step 8-32, the input stage concludes 8-34. User can preferably also give stage backward—command 8-36 and move to previous stage of input process in step 8-40.

There are also other possible commands, which are not dealt with in FIG. 8.

All possible ways of determining the objective should be expressible by user interface. To all objectives inputted by the user the system should respond in a sensible way, e.g. by providing the service that supports the inputted objective. The user interface of the invention and its embodiments solves the problem of finding a service by guiding the user to use objective statements already in the system but also making it possible for the user to use a totally new objective statement.

For the invention and its embodiments to work in the best way, as many as possible objective statements with sensibly associated services are needed. This requires process that supports producing of objective statements and their associating to services, and process to decide what objective statements and services linked thereto are available for users via the user interface UI.

As described above UI directs the user to find very efficiently those already to the system created services that match his objective. However, there may be a situation in which there is no objective statement that satisfies the need of the user. Also in this case the user interface UI can help the user to reach his objective. As stated earlier, common service request can be used for linking new services to objective statements. At the same time the new objective statement entered by the user is introduced to the system so that the database for objective statements is updated dynamically. This is important, because consumer researches that could be used instead of this invention to find out objectives and related services, could reveal only few objectives, which would create too limited databases for the purpose e.g. related to specific moments or happening.

The presence of the common service request is important e.g. because of usability and reachability, i.e. all possible intelligible objective statements can sooner or later be associated to suitable services, if such services exists. In order to obtain rapidly as good answers to common service requests as possible, processes can be used that delivers the request to as many potential answerers as possible.

The service can be the reply to the objective statement, which service can be formed directly so that the reply itself is the content service. Alternatively the reply can comprise a link to the service, and service description can be formed based on the reply. The link or content can then be delivered to the user equipment and the user can be informed thereof. In one embodiment of the invention, the informing is done via promoting the objective statement e.g. in the dynamically ordered part of UI.

One possible embodiment of the invention is to reward users by using tipping. This means that e.g. the user, who has given a hint, an answer or a reply to the common service request can be rewarded by money, time, a service etc. Common service request can comprise the objective statement, expiry time of the request and the amount of tip offered. The answer to the question can comprise the validity time of the answer, is tip asked from other users who express the same objective statement and could use the delivery of the answer as service, and the amount of tip asked. In the case of tipping, the amount of tip can be transmitted to the mediator, as well as the user who asked the question and the user who answered the question. It is to be noted that all information can be communicated via the mediator for privacy reasons. In order to further encourage tipping and answering mediator can without compromising the privacy of users tell they average behaviour when tipping, e.g. the average amount of tip or average amount of offered tip versus asked.

In the invention and its embodiments the user expresses his objective to the teleinformatic system and the system helps the user to reach his objective, whether this objective is a short-term objective or a long-term objective. In the invention and its embodiments objectives can be reached easily and rapidly by the system based on the usage of lots of users and thereby guiding users to services that are often required by some objectives. With the help of the method many different objectives can be expressed. Examples of objectives are: going to a movie with friends, remembering of wife's birthday, preserving health, buying a dream house and using a function of an apparatus. All these objectives and others can be reached from the same user interface in a convenient way.

The objectives that devices can according to the invention and its embodiments help to reach can vary from very the high-level objectives like "raising children well" to the objectives that are supposed to be reached immediately, like "calling home". In this way many of the problems of the current user interfaces like being too fragmented into different kinds of applications and functionalities being available only within them so that the users have to first find the application, then start it and master its functionality, can be largely avoided.

In other words, the user interfaces according to the invention and its embodiments can use an integrated method with the help of which users can control their objectives efficiently and be informed/reminded about the objectives that are somehow relevant at the current moment or use context.

The invention and its embodiments relates to method by which the user can easily and rapidly express any objective and obtain information to reach the objective. The method is like the use of a natural language without drawbacks of use of natural language like unnecessary dialogs. The invention and its embodiments further relates to method by which the user of teleinformatic system can with the help of user interface UI functioning same uniform user logic and the processes to maintain express easily and rapidly his objectives;
  to reach services related to objectives;
  ask for help to reach the objective;
  remember his objectives and tasks related thereto;
  obtain information on objectives which he can promote to reach at certain time, certain place and situation, e.g. by services linked to objectives;
  review of matching of different services to reach objectives so that other users can easily use the reviews;
  start cooperation with some other party, e.g. some other user to reach the objectives; and
  publish contents and services for other users.

The present invention can work as enabler for other objective-oriented methods. Top- and sub-relations can be formed between objectives to e.g. help users plan their life better. The information collected by the use of the invention can be used in various ways, as it gives objective-oriented view to services. Service providers can learn better, what are the objectives of people using their services. Keyword searches can be maid more objective-oriented.

The present invention and its embodiments provide a method and an apparatus for implementing the method so as to solve problems relating to user interfaces of prior art and natural language. Advances in computing power and other technological progress have resulted in more and more functionality being integrated to devices. As gadgets like DVD/HDD-recorder with Internet connection have arisen, the requirement for ease of use is getting harder and harder to reach. Same problem is present with e.g. mobile devices like smart phones, and numerous other devices. By tailoring services to specific objectives service providers and device manufacturers can make this functionality available for anyone who can write, and when enough objective statements are handled, the user can often reach his objective by using the first statement that comes to his mind.

The present invention and its embodiments provide many advantages over the prior art. The present invention and its embodiments overcome many problems related to menus, commands and natural language. It saves time and keystrokes. It offers users new way for finding services that help them to reach their objectives and service providers new ways for offering objective oriented services by e.g. implementing objective oriented "wizards" tailored for the objective in question. The user does not have to remember commands and attributes and their orders or the structure of menus to find out what he is looking for. To input a command is burdensome at least with input means of current mobile devices. This can be avoided. The user does not have to modify or to personalize menus. Also too deep hierarchies or altering menus are avoided, because the presentation of functions e.g. mobile services outside of apparatus do not need their own reserved place in the menu-hierarchy. Furthermore, the users are offered alternative ways, synonyms, to start the function. The definition "one size fits all" is avoided.

It will be obvious to a person skilled in the art that, as the technology advances, the inventive concept can be implemented in various ways. The invention and its embodiments are not limited to the examples described above but may vary within the scope of the claims.

The invention claimed is:

1. A method executed by a data processor of requesting a service in a network that supports multiple users, characterised by
   maintaining a verb list comprising several verbs (3-2);
   maintaining an object part list comprising several object parts (3-6);
   maintaining a service list indicating several services (3-14);
   maintaining a first association list comprising several first associations (3-10), each of which associates one verb in the verb list and one object part in the object part list;
   maintaining a second association list comprising several second associations (3-18), each of which associates one service in the service list and one first association;
   displaying at least one verb from the verb list to the user;
   displaying at least one object part from the object part list to the user, which object part has an association with the verb in the first association list,
   selecting services such that each selected service has an association with the combination formed by the verb and the object part, and displaying the selected services to the user;
   in response to receiving an acceptance of a service from the user, requesting the user-accepted service via the network.

2. A method according to claim 1, characterised by;
   in response to receiving a beginning of a user input, selecting verbs from said verb list, such that the selected verbs match said beginning of the user input, and displaying the selected verbs to the user.

3. A method according to claim 2, characterised by;
   selecting object parts such that each selected object part has an association with the user-accepted verb in the first association list, and displaying the selected object parts to the user.

4. A method according to claim 3, characterised by;
   selecting services such that each selected service has an association with the combination formed by the user-accepted verb and the user-accepted object part, and displaying the selected services to the user.

5. A method according to claim 1, characterised by;
   selecting the object parts in response to receiving an acceptance of the verb from the user.

6. A method according to claim 1, characterised by;
   selecting the object parts without receiving an acceptance of the verb from the user.

7. A method according to claim 1, characterised by;
   selecting the services in response to receiving an acceptance of the object part from the user.

8. A method according to claim 1, characterised by;
   selecting the services are selected without receiving an acceptance of the object part from the user.

9. A method according to claim 1, characterised by;
   comprising maintaining a first probability (3-4) for the verbs (3-2) in the verb list and displaying the selected verbs in order of decreasing first probability.

10. A method according to claim 1, characterised by;
    comprising maintaining a second probability (3-12) for the first associations (3-10) and displaying the selected object parts in order of decreasing second probability of first associations that contain the selected object parts.

11. A method according to claim 10, characterised by;
    comprising maintaining a third probability (3-20) for the second associations (3-18) and displaying the selected services in order of decreasing third probability of second associations that contain the selected services.

12. A method according to claim 1, characterised in that there are one or more specifiers (6-6) associated with some of the object parts (6-4).

13. A method according to claim 9, characterised by;
    comprising maintaining the first probability for the verbs (3-2) in the verb list from several terminals and distributing the first probability among the several terminals.

14. A method according to claim 1, characterised by;
    after displaying verbs or object parts, keeping one verb or object part highlighted according to the user selection and giving means to the user to accept the currently highlighted verb or object part.

15. A method according to claim 1, characterised by;
    in response to receiving a beginning of the user input of a verb, prior the user accepting a verb from said verb list, selecting object parts such that each selected object part has an association with the currently highlighted verb in the first association list, and displaying the selected object parts to the user.

16. A method according to claim 1, characterised by;
    in response to receiving an acceptance of a verb and beginning of the user input of an object part, prior the user accepting an object part, selecting object parts from said object part list, such that the selected object parts match said beginning of the user input of an object part, and selecting services such that each selected service has an association with the currently highlighted object part in the second association list, and displaying the selected services to the user.

17. A method according to claim 1, characterised by;
in response to the user accepting the verb and the object part, delivering the first association to a second user via the network and in case the second user forming the second association, delivering information about said second association to a mediator for adding it into maintained a second associations list in the mediator and delivering information about said service to the first user.

18. A method according to claim 1, characterised by;
prior to receiving a beginning of a user input displaying a verb from the verb list and an object part from the object part list such that the object part has an association with the verb in the first association list.

19. A method according to claim 18, characterised by;
selecting the object part according to the usage frequency and/or the use situation and/or the user equipment and/or the preferences of the user.

20. A method according to claim 1, characterised by;
after the user accepting object part, forming one or more second association(s) by searching descriptions associated to services for words extracted from said object part.

21. A method according to claim 1, characterised by;
displaying at least one selected verb from the verb list and at least two object parts from the object part list such that at least one object part of the at least two object parts has an association with the selected verb in the first association list.

22. A method according to claim 1, characterised by;
forming multiple objective statements each being formed by the at least one verb and at least one object part and ordering some of the objective statements statically and some of the objective statements dynamically.

23. A method according to claim 22, characterised by displaying only different verbs in the statically ordered part of a display.

24. A method according to claim 1, characterised by accepting the combination of the verb and the object part in one phase.

25. A method according to claim 1, characterised by accepting the combination of the verb and the object part in two phases by first accepting the verb and then accepting the object part.

26. A method according to claim 1, characterised by;
prior to accepting the combination of the verb and the object part displaying to the user the service that has an association with the combination formed by the verb and the object part.

27. A method according to claim 22, characterised by;
the dynamically ordered objective statements changing in response to at least one of the following function: the relevance for the user and the relevance for the situation.

28. A method according to claim 1, characterised by displaying to the user a predefined service in case the service list is empty.

29. An apparatus for requesting a service in a network that supports multiple users, characterised in that the apparatus comprises
a verb list comprising several verbs (3-2);
an object part list comprising several object parts (3-6);
a service list indicating several services (3-14);
a first association list comprising several first associations (3-10), each of which associates one verb in the verb list and one object part in the object part list;
a second association list comprising several second associations (3-18), each of which associates one service in the service list and one first association;
a routine for displaying at least one verb from the verb list to the user;
a routine for displaying at least one object part from the object part list to the user, which object part has an association with the verb in the first association list;
a routine for selecting services such that each selected service has an association with the combination formed by the verb and the object part, and displaying the selected services to the user;
a routine for requesting the user-accepted service via the network in response to receiving an acceptance of a service from the user.

30. An apparatus according to claim 29, characterised in that the apparatus comprises a routine for selecting verbs from said verb list in response to receiving a beginning of a user input, such that the selected verbs match said beginning of the user input, and displaying the selected verbs to the user.

31. An apparatus according to claim 30, characterised in that the apparatus comprises a routine for selecting object parts such that each selected object part has an association with the user-accepted verb in the first association list, and displaying the selected object parts to the user.

32. An apparatus according to claim 31, characterised in that the apparatus comprises a routine for selecting services such that each selected service has an association with the combination formed by the user-accepted verb and the user-accepted object part, and displaying the selected services to the user.

33. An apparatus according to claim 29, characterised in that the apparatus comprises a routine for displaying at least one selected verb from the verb list and at least two object parts from the object part list such that at least one object part of the at least two object parts has an association with the selected verb in the first association list.

34. An apparatus according to claim 29, characterised in that the apparatus comprises a routine for forming multiple objective statements each being formed by the at least one verb and at least one object part and ordering some of the objective statements statically and some of the objective statements dynamically.

35. An apparatus according to claim 29, characterised in that, the apparatus is provided in a user equipment.

36. An apparatus according to claim 29, characterised in that, the apparatus is provided in a network element.

* * * * *